(12) United States Patent
Farber et al.

(10) Patent No.: US 6,654,807 B2
(45) Date of Patent: Nov. 25, 2003

(54) INTERNET CONTENT DELIVERY NETWORK

(75) Inventors: David A. Farber, Oak View, CA (US); Richard E. Greer, Red Lodge, MT (US); Andrew D. Swart, Westlake Village, CA (US); James A. Balter, Santa Barbara, CA (US)

(73) Assignee: Cable & Wireless Internet Services, Inc., San Francisco, CA (US)

( * ) Notice: Subject to any disclaimer, the term of this patent is extended or adjusted under 35 U.S.C. 154(b) by 0 days.

(21) Appl. No.: 10/004,430

(22) Filed: Dec. 6, 2001

(65) Prior Publication Data

US 2002/0049857 A1 Apr. 25, 2002

Related U.S. Application Data

(63) Continuation of application No. 09/612,598, filed on Jul. 7, 2000, which is a continuation of application No. 09/021,506, filed on Feb. 10, 1998, now Pat. No. 6,185,598.

(51) Int. Cl.⁷ .............................................. G06F 15/173
(52) U.S. Cl. ..................... 709/225; 709/226; 709/229
(58) Field of Search ................. 709/225, 226, 709/229

(56) References Cited

U.S. PATENT DOCUMENTS

| | | | |
|---|---|---|---|
| 4,495,570 A | 1/1985 | Kitajima et al. | |
| 4,594,704 A | 6/1986 | Ollivier | |
| 4,726,017 A | 2/1988 | Krum et al. | |
| 4,839,798 A | 6/1989 | Eguchi et al. | |
| 4,920,432 A | 4/1990 | Eggers | |
| 4,922,417 A | 5/1990 | Churm et al. | 707/1 |
| 4,949,187 A | 8/1990 | Cohen | |
| 4,949,248 A | 8/1990 | Caro | |
| 5,172,413 A | 12/1992 | Bradley | |

(List continued on next page.)

FOREIGN PATENT DOCUMENTS

| | | |
|---|---|---|
| CA | 2202572 | 10/1998 |
| EP | 0 801 487 | 4/1997 |
| EP | 0801487 A | 10/1997 |
| EP | 0 824 236 A2 | 2/1998 |
| EP | 865180 A2 | 9/1998 |
| GB | 2281793 A | 3/1995 |
| GB | 2 281 793 | 3/1995 |
| GB | 2 281 793 A | 3/1995 |
| JP | 05162529 | 6/1993 |
| JP | 08328583 | 9/1996 |
| WO | 96/42041 | 12/1996 |
| WO | WO 96/42041 | 12/1996 |
| WO | WO 97/11429 | 3/1997 |
| WO | 97/11429 | 3/1997 |
| WO | 97/29423 | 8/1997 |
| WO | WO9729423 A | 8/1997 |
| WO | 9804985 | 2/1998 |

OTHER PUBLICATIONS

Andresen et al., "SWEB: Towards a Scalable World Wide Web Server on Multicomputers", Proceedings of IPPS, Apr. 15, 1996, pp. 850–856.

Mourad et al., "Scalable Web Server Architectures", Proceedings IEEE Symposium on Computers and Communications, Jul. 1, 1997, pp. 12–16.

(List continued on next page.)

Primary Examiner—Mehmet B. Geckil
(74) Attorney, Agent, or Firm—Blakely Sokoloff Taylor & Zafman LLP

(57) ABSTRACT

Resource requests made by clients of origin servers in a network are intercepted by reflector mechanisms and selectively reflected to other servers called repeaters. The reflectors select a best repeater from a set of possible repeaters and redirect the client to the selected best repeater. The client then makes the request of the selected best repeater. The resource is possibly rewritten to replace at least some of the resource identifiers contained therein with modified resource identifiers designating the repeater instead of the origin server.

48 Claims, 6 Drawing Sheets

U.S. PATENT DOCUMENTS

| | | |
|---|---|---|
| 5,253,341 A | 10/1993 | Rozmanith |
| 5,287,499 A | 2/1994 | Nemes ......................... 707/2 |
| 5,287,537 A | 2/1994 | Newmark et al. |
| 5,291,554 A | 3/1994 | Morales |
| 5,341,477 A | 8/1994 | Pitkin |
| 5,371,532 A | 12/1994 | Gelman |
| 5,410,343 A | 4/1995 | Coddington |
| 5,414,455 A | 5/1995 | Hooper |
| 5,442,389 A | 8/1995 | Blahut |
| 5,442,390 A | 8/1995 | Hooper |
| 5,442,749 A | 8/1995 | Northcutt |
| 5,471,622 A | 11/1995 | Eadline |
| 5,475,615 A | 12/1995 | Lin |
| 5,508,732 A | 4/1996 | Bottomley |
| 5,515,511 A | 5/1996 | Nguyen |
| 5,519,435 A | 5/1996 | Anderson |
| 5,528,281 A | 6/1996 | Grady |
| 5,539,621 A | 7/1996 | Kikinis |
| 5,542,087 A | 7/1996 | Neimat et al. ................. 707/10 |
| 5,544,313 A | 8/1996 | Shachnai |
| 5,544,327 A | 8/1996 | Dan |
| 5,550,577 A | 8/1996 | Verbiest |
| 5,550,863 A | 8/1996 | Yurt |
| 5,550,982 A | 8/1996 | Long |
| 5,557,317 A | 9/1996 | Nishio |
| 5,572,643 A | 11/1996 | Judson |
| 5,590,288 A | 12/1996 | Castor |
| 5,592,611 A | 1/1997 | Midgely |
| 5,594,910 A | 1/1997 | Filepp et al. |
| 5,603,026 A | 2/1997 | Demers et al. ................. 707/8 |
| 5,619,648 A | 4/1997 | Canale |
| 5,623,656 A | 4/1997 | Lyons |
| 5,625,781 A | 4/1997 | Cline |
| 5,627,829 A | 5/1997 | Gleeson et al. |
| 5,630,067 A | 5/1997 | Kindell |
| 5,633,999 A | 5/1997 | Clowes |
| 5,634,006 A | 5/1997 | Baugher et al. |
| 5,638,443 A | 6/1997 | Stefik et al. ................... 705/54 |
| 5,644,714 A | 7/1997 | Kikinis |
| 5,646,676 A | 7/1997 | Dewkett et al. ................ 348/7 |
| 5,649,186 A | 7/1997 | Ferguson |
| 5,659,729 A | 8/1997 | Nielsen |
| 5,666,362 A | 9/1997 | Chen |
| 5,671,279 A | 9/1997 | Elgamal |
| 5,682,512 A | 10/1997 | Tetrick |
| 5,699,513 A | 12/1997 | Feigen et al. |
| 5,712,979 A | 1/1998 | Graber et al. ................ 709/211 |
| 5,715,453 A | 2/1998 | Stewart |
| 5,721,914 A | 2/1998 | DeVries |
| 5,734,831 A | 3/1998 | Sanders |
| 5,740,423 A | 4/1998 | Logan et al. .................. 707/10 |
| 5,742,762 A | 4/1998 | Scholl |
| 5,751,961 A | 5/1998 | Smyk ......................... 709/217 |
| 5,761,507 A | 6/1998 | Govett ........................ 709/304 |
| 5,761,663 A | 6/1998 | Lagarde ....................... 709/203 |
| 5,764,906 A * | 6/1998 | Edelstein et al. ............ 709/219 |
| 5,774,660 A | 6/1998 | Brendel |
| 5,774,668 A | 6/1998 | Choquier et al. |
| 5,777,989 A | 7/1998 | McGarvey |
| 5,784,058 A | 7/1998 | LaStrange et al. |
| 5,796,952 A | 8/1998 | Davis |
| 5,799,141 A | 8/1998 | Galipeau et al. |
| 5,802,291 A | 9/1998 | Balick et al. ................ 709/202 |
| 5,812,769 A | 9/1998 | Graber et al. ................ 709/212 |
| 5,828,847 A | 10/1998 | Gehr |
| 5,832,506 A | 11/1998 | Kuzma ........................ 707/200 |
| 5,832,514 A * | 11/1998 | Norin et al. ................. 707/202 |
| 5,835,718 A | 11/1998 | Blewett ....................... 709/218 |
| 5,856,974 A | 1/1999 | Gervais et al. ............... 370/392 |
| 5,862,339 A | 1/1999 | Bonnaure et al. ........... 709/227 |
| 5,867,706 A | 2/1999 | Martin ........................ 395/675 |
| 5,867,799 A | 2/1999 | Lang et al. |
| 5,870,546 A | 2/1999 | Kirsch ........................ 709/238 |
| 5,870,559 A | 2/1999 | Leshem et al. .............. 709/224 |
| 5,878,212 A | 3/1999 | Civanlar et al. ............. 709/203 |
| 5,884,038 A | 3/1999 | Kapoor ........................ 709/226 |
| 5,890,171 A | 3/1999 | Blumer et al. ............... 707/501 |
| 5,893,116 A * | 4/1999 | Simmonds et al. .......... 707/201 |
| 5,896,533 A | 4/1999 | Ramos et al. |
| 5,903,723 A | 5/1999 | Beck et al. .................. 709/200 |
| 5,907,704 A | 5/1999 | Gudmundson et al. |
| 5,913,028 A | 6/1999 | Wang et al. |
| 5,913,033 A | 6/1999 | Grout |
| 5,918,010 A | 6/1999 | Appleman et al. |
| 5,919,247 A | 7/1999 | Van Hoff et al. |
| 5,920,701 A * | 7/1999 | Miller et al. ................. 709/228 |
| 5,933,832 A | 8/1999 | Suzuoka et al. ............. 707/101 |
| 5,935,207 A * | 8/1999 | Logue et al. ................. 709/219 |
| 5,945,989 A | 8/1999 | Freishtat et al. ............. 345/329 |
| 5,956,489 A * | 9/1999 | San Andres et al. ........ 709/221 |
| 5,956,716 A | 9/1999 | Kenner |
| 5,958,008 A | 9/1999 | Pogrebisky et al. |
| 5,961,596 A | 10/1999 | Takubo et al. |
| 5,968,121 A | 10/1999 | Logan et al. |
| 5,983,214 A | 11/1999 | Lang et al. |
| 5,983,227 A | 11/1999 | Nazem ........................ 707/10 |
| 5,987,606 A * | 11/1999 | Cirasole et al. ............. 713/200 |
| 5,991,809 A | 11/1999 | Kriegsman |
| 6,006,264 A | 12/1999 | Colby et al. ................. 709/226 |
| 6,012,090 A | 1/2000 | Chung et al. |
| 6,014,686 A * | 1/2000 | Elnozahy et al. ............ 709/202 |
| 6,026,440 A * | 2/2000 | Shrader et al. .............. 709/224 |
| 6,029,175 A | 2/2000 | Chow et al. ................. 707/104 |
| 6,035,332 A | 3/2000 | Ingrassia, Jr. et al. |
| 6,038,610 A | 3/2000 | Belfiore et al. ............. 709/310 |
| 6,041,324 A | 3/2000 | Earl et al. ...................... 707/9 |
| 6,052,718 A | 4/2000 | Gifford ........................ 709/219 |
| 6,052,730 A | 4/2000 | Felciano et al. ............. 709/225 |
| 6,065,051 A | 5/2000 | Steele et al. |
| 6,065,062 A | 5/2000 | Periasamy et al. .......... 709/242 |
| 6,070,191 A | 5/2000 | Narendran et al. |
| 6,081,829 A | 6/2000 | Sidana ......................... 709/203 |
| 6,092,112 A | 7/2000 | Fukushige |
| 6,092,204 A * | 7/2000 | Baker .......................... 713/201 |
| 6,108,673 A | 8/2000 | Brandt et al. |
| 6,108,703 A | 8/2000 | Leighton et al. ............. 709/226 |
| 6,112,231 A | 8/2000 | DeSimone et al. .......... 709/213 |
| 6,112,240 A | 8/2000 | Pogue et al. |
| 6,128,601 A | 10/2000 | Van Horne et al. |
| 6,128,660 A | 10/2000 | Grimm et al. |
| 6,144,375 A | 11/2000 | Jain et al. |
| 6,173,311 B1 * | 1/2001 | Hassett et al. ............... 709/202 |
| 6,178,160 B1 | 1/2001 | Bolton et al. |
| 6,185,619 B1 | 2/2001 | Joffe et al. |
| 6,189,030 B1 | 2/2001 | Kirsch et al. ................ 709/224 |
| 6,282,569 B1 | 8/2001 | Wallis et al. |
| 6,480,893 B2 * | 11/2002 | Kriegsman ................... 709/226 |
| 6,484,204 B1 * | 11/2002 | Rabinovich .................. 709/226 |
| 6,502,215 B2 | 12/2002 | Raad et al. |

OTHER PUBLICATIONS

Adler, "Distributed Coordination Models for Client/Server Computing", Computer, vol. 28, No. 4, Apr. 1, 1995, pp. 14–22.

International Search Report dated Jun. 8, 1999 for PCT/US99/01477.

"Local Area Network Server Replacement Procedure," IBM Technical Disclosure Bulletin, vol. 348, No. 01, Jan. 1995, pp. 235–236, ISSN: 0018-8696.

Gwertzman, J. S., et al., The Case for Geographical push–caching, Workshop on Hot Topics in Operating Systems, May 4, 1995, pp. 51–55.

De Bra, P. M. E. et al, "Information Retrieval in the World–Wide Web: Making client–based searching feasible," Computer Networks and ISDN System, NL, North Holland Publishing, Amsterdam, vol. 27, No. 2, Nov. 1, 1994, pp. 183–192, ISSN: 0169-7552.

Communication (1 page) and European Search Report for Appln. No. EP 00 12 8346 (3 pages) mailed Aug. 24, 2001.

Bestavros, Azer,"Speculative Data Dissemination and Service to Reduce Server Load, Network Traffic and Service Time in Distributed Information Systems." In Proceedings of ICDE '96: The 1996 International Conference on Data Engineering, Mar. 1996, 4 pgs.

Carter, J. Lawrence, et al. "Universal Classes of Hash Functions." Journal of Computer and System Sciences, vol. 18, No. 2, Apr. 1979, pp. 143–154.

Chankhunthod, Anawat, et al. "A Hierarchical Internet Object Cache." In USENIX Proceedings, Jan. 1996, pp. 153–163.

Cormen, Thomas H., et al. *Introduction to Algorithms,* The MIT Press, Cambridge, Massachusetts, 1994, pp. 219–243, 991–993.

Deering, Stephen, et al. "Multicast Routing in Datagram Internetworks and Extended LANs." ACM Transactions on Computer Systems, vol. 8, No. 2, May 1990, pp. 85–110.

Devine, Robert, "Design and Implementation of DDH: A Distributed Dynamic Hashing Algorithm." In Proceedings of 4th International Conference on Foundations of Data Organizations and Algorithms, 1993, pp. 101–114.

Grigni, Michelangelo, et al. "Tight Bounds on Minimum Broadcasts Networks." SIAM Journal of Discrete Mathematics, vol. 4, No. 2, May 1991, pp. 207–222.

Gwertzman, James, et al. "The Case for Geographical Push–Caching." Technical Report HU TR 34–94 (excerpt), Harvard University, DAS, Cambridge, MA 02138, 1994, 2 pgs.

Gwertzman, James et al. "World–Wide Web Cache Consistency." In Proceedings of the 1996 USENIX Technical Conference, Jan. 1996, 8 pgs.

Feeley, Michael, et al. "Implementing Global Memory Management in a Workstation Cluster." In Proceedings of the 15th ACM Symposium on Operating Systems Principles, 1995, pp. 201–212.

Floyd, Sally, et al. "A Reliable Multicast Framework for Light–Weight Sessions and Application Level Framing." In Proceeding of ACM SIGCOMM '95, pp. 342–356.

Fredman, Michael, et al. "Storing a Sparse Table with 0(1) Worst Case Access Time." Journal of the Association for Computing Machinery, vol. 31, No. 3, Jul. 1984, pp. 538–544.

Karger, David, et al. "Consistent Hashing and Random Trees: Distributed Caching Protocols for Relieving Hot Spots on the World Wide Web." In Proceedings of the Twenty–Ninth Annual ACM Symposium on Theory of Computing, May 1997, pp. 654–663.

Litwin, Wlthold, et al. "LH–A Scaleable, Distributed Data Structure." ACM Transactions on Database Systems, vol. 21, No. 4, Dec. 1996, pp. 480–525.

Malpani, Radhika, et al. "Making World Wide Web Caching Servers Cooperate." In Proceedings of World Wide Web Conference, 1996, 6 pgs.

Naor, Moni, et al. "The Load, Capacity and Availability of Quorum Systems." In Proceedings of the 35th IEEE Symposium on Foundations of Computer Science, Nov. 1994, pp. 214–225.

Nisan, Noam. "Psuedorandom Generators for Space–Bounded Computation." In Proceedings of the Twenty–Second Annual ACM Symposium on Theory of Computing, May 1990, pp. 204–212.

Palmer, Mark, et al. "Fido: A Cache that Learns to Fetch." In Proceedings of the 17th International Conference on Very Large Data Bases, Sep. 1991, pp. 255–264.

Panigrahy, Rina. Relieving Hot Spots on the World Wide Web. Massachusetts Institute of Technology, Jun. 1997, pp. 1–66.

Peleg, David, et al. "The Availabiltiy of Quorum Systems." Information and Computation 123, 1995, 210–223.

Plaxton, C. Greg, et al. "Fast Fault–Tolerant Concurrent Access to Shared Objects." In Proceedings of 37th IEEE Symposium of Foundations of Computer Science, 1996, pp. 570–579.

Rabin, Michael. "Efficient Dispersal of Information for Security, Load Balancing, and Fault Tolerance." Journal of the ACM, vol. 36, No. 2, Apr. 1989, pp. 335–348.

Ravi, R., "Rapid Rumor Ramification: Approximating the Minimum Broadcast Time." In Proceedings of the 35th IEEE Symposium on Foundation of Computer Science, Nov. 1994, pp. 202–212.

Schmidt, Jeanette, et al. "Chernoff–Hoeffding Bounds for Applications with Limited Independence." In Proceedings of the 4th ACS–SIAM Symposium on Discrete Algorithms, 1993, pp. 331–340.

Tarjan, Robert Endre, et al. "Storing a Sparse Table." Communications of the ACM, vol. 22, No. 11, Nov. 1979, pp. 606–611.

Vitter, Jeffrey Scott, et al. "Optimal Prefetching via Data Compression." In Proceedings of 32nd IEEE Symposium on Foundations of Computer Science, Nov. 1991, pp. 121–130.

Wegman, Mark, et al. "New Hash Functions and Their Use in Authentication and Set Equality." Journal of Computer and System Sciences vol. 22, Jun. 1981, pp. 265–279.

Yao, Andrew Chi–Chih. "Should Tables be Sorted?" Journal of the Association for Computing Machinery, vol. 28, No. 3, Jul. 1981, pp. 615–628.

Patent Abstracts of Japan, Method and Device for Repeating and Converting Information, Sep. 1996, JP 08328583.

Cisco Distributed Director, CISCO Systems Inc., pp. 1–15, http://www.cisco.com/warp/public/751/distdir/dd_wp.htm, 1997.

"Cisco Local Director Product Overview." CISCO Systems Inc., 1997, pp. 1–4, http://www.cisco.com/warp/public/751/lodir/lodir_ds.htm.

"Local Director". Cisco Systems Inc., pp. 1–3.

"Excite Chooses Cisco LocalDirector to Support its Growing Service." Cisco Systems Inc., 1997, pp. 1–2, http://www.cisco.com/warp/public/146/1857.html.

"Cisco Systems Ships Cisco LocalDirector to Meet Demands of High–Volume Web Traffic." CISCO Systems Inc., 1996, pp. 1–2, http://www.cisco.com/warp/public/146/323.html.

"Scaling the Internet News Service." Cisco Systems Inc., 1997, pp. 1–11, http://www.cisco.com/warp/public/751/lodir/news_wp.htm.

"Scaling the World Wide Web." SISCO Systems Inc., 1996, pp. 1–7, http://www.cisco.com/wapr/public/751/lodir/swww_wp.html.

"How to Cost-Effectivley Scale Web Servers." CISCO Systems Inc., 1996, pp. 1–5, http://www.cisco.com/warp/public/784/5.html.

"Cisco Cache Engine." CISCO Systems Inc., 1 pg, http://www.cisco.com/warp/public/751/cache/index.shtml.

"Cisco Introduces Web Cache Product for Scaling the Internet." CISCO Systems Inc., 1997, 1 pg, http://www.cisco.com/warp/public/146/1947.html.

"Cache Director System," CISCO Systems Inc., 1997, pp. 1–5, http://www.cisco.com/warp/public/751/cache/cds_ov.htm.

"Local Director." 2 pgs, http://www.cisco.com/warp/public/751/lodir/index.html.

"Cisco Takes Global Route." PC Week News, Feb. 17, 1997, p. 23.

"Global IP/IPX Service Should Keep Network Delays Down." Infoworld, Jan. 20, 1997, 1 pg.

Patent Abstracts of Japan, "Electronic Mail Multiplexing System and Communication Control Method in The System." Jun. 30, 1993, JP 05162529.

"Cache Director Systems Technology Overview." CISCO System Inc., 1997, pp. 1–3, http://www.cisco.com/warp/public/751/cache/cds_ds.htm.

"Local Area Network Server Replacement Procedure", IBM Technical Disclosure Bulletin, vol. 38, No. 01, Jan. 1995, pp. 235–236.

Gwertzman, James, et al. "The Case for Geographical Push-Caching", May 4, 1995, pp. 51–55.

De Bra, P.M.E., et al. "Information retrieval in the World-Wide Web: Making client-based searching feasible", Computer Networks and ISDN Systems 27, (1994), pp. 183–192.

* cited by examiner

INTERNET CONTENT DELIVERY NETWORK

This is a Continuation of National application Ser. No. 09/612,598 filed Jul. 7, 2000, which is a Continuation of National application Ser. No. 09/021,506 filed Feb. 10, 1998 now U.S. Pat. No. 6,185,598.

FIELD OF THE INVENTION

This invention relates to replication of resources in computer networks.

BACKGROUND OF THE INVENTION

The advent of global computer networks, such as the Internet, have led to entirely new and different ways to obtain information. A user of the Internet can now access information from anywhere in the world, with no regard for the actual location of either the user or the information. A user can obtain information simply by knowing a network address for the information and providing that address to an appropriate application program such as a network browser.

The rapid growth in popularity of the Internet has imposed a heavy traffic burden on the entire network. Solutions to problems of demand (e.g., better accessibility and faster communication links) only increase the strain on the supply. Internet Web sites (referred to here as "publishers") must handle ever-increasing bandwidth needs, accommodate dynamic changes in load, and improve performance for distant browsing clients, especially those overseas. The adoption of content-rich applications, such as live audio and video, has further exacerbated the problem.

To address basic bandwidth growth needs, a Web publisher typically subscribes to additional bandwidth from an Internet service provider (ISP), whether in the form of larger or additional "pipes" or channels from the ISP to the publisher's premises, or in the form of large bandwidth commitments in an ISP's remote hosting server collection. These increments are not always as fine-grained as the publisher needs, and quite often lead times can cause the publisher's Web site capacity to lag behind demand.

To address more serious bandwidth growth problems, publishers may develop more complex and costly custom solutions. The solution to the most common need, increasing capacity, is generally based on replication of hardware resources and site content (known as mirroring), and duplication of bandwidth resources. These solutions, however, are difficult and expensive to deploy and operate. As a result, only the largest publishers can afford them, since only those publishers can amortize the costs over many customers (and Web site hits).

A number of solutions have been developed to advance replication and mirroring. In general, these technologies are designed for use by a single Web site and do not include features that allow their components to be shared by many Web sites simultaneously.

Some solution mechanisms offer replication software that helps keep mirrored servers up-to-date. These mechanisms generally operate by making a complete copy of a file system. One such system operates by transparently keeping multiple copies of a file system in synch. Another system provides mechanisms for explicitly and regularly copying files that have changed. Database systems are particularly difficult to replicate, as they are continually changing. Several mechanisms allow for replication of databases, although there are no standard approaches for accomplishing it.

Several companies offering proxy caches describe them as replication tools. However, proxy caches differ because they are operated on behalf of clients rather than publishers.

Once a Web site is served by multiple servers, a challenge is to ensure that the load is appropriately distributed or balanced among those servers. Domain name-server-based round-robin address resolution causes different clients to be directed to different mirrors.

Another solution, load balancing, takes into account the load at each server (measured in a variety of ways) to select which server should handle a particular request.

Load balancers use a variety of techniques to route the request to the appropriate server. Most of those load-balancing techniques require that each server be an exact replica of the primary Web site. Load balancers do not take into account the "network distance" between the client and candidate mirror servers.

Assuming that client protocols cannot easily change, there are two major problems in the deployment of replicated resources. The first is how to select which copy of the resource to use. That is, when a request for a resource is made to a single server, how should the choice of a replica of the server (or of that data) be made. We call this problem the "rendezvous problem". There are a number of ways to get clients to rendezvous at distant mirror servers. These technologies, like load balancers, must route a request to an appropriate server, but unlike load balancers, they take network performance and topology into account in making the determination.

A number of companies offer products which improve network performance by prioritizing and filtering network traffic. Proxy caches provide a way for client aggregators to reduce network resource consumption by storing copies of popular resources close to the end users. A client aggregator is an Internet service provider or other organization that brings a large number of clients operating browsers to the Internet. Client aggregators may use proxy caches to reduce the bandwidth required to serve web content to these browsers. However, traditional proxy caches are operated on behalf of Web clients rather than Web publishers.

Proxy caches store the most popular resources from all publishers, which means they must be very large to achieve reasonable cache efficiency. (The efficiency of a cache is defined as the number of requests for resources which are already cached divided by the total number of requests.)

Proxy caches depend on cache control hints delivered with resources to determine when the resources should be replaced. These hints are predictive, and are necessarily often incorrect, so proxy caches frequently serve stale data. In many cases, proxy cache operators instruct their proxy to ignore hints in order to make the cache more efficient, even though this causes it to more frequently serve stale data.

Proxy caches hide the activity of clients from publishers. Once a resource is cached, the publisher has no way of knowing how often it was accessed from the cache.

SUMMARY OF THE INVENTION

This invention provides a way for servers in a computer network to off-load their processing of requests for selected resources by determining a different server (a "repeater") to process those requests. The selection of the repeater can be made dynamically, based on information about possible repeaters.

If a requested resource contains references to other resources, some or all of these references can be replaced by references to repeaters.

Accordingly, in one aspect, this invention is a method of processing resource requests in a computer network. First a client makes a request for a particular resource from an origin server, the request including a resource identifier for the particular resource, the resource identifier sometimes including an indication of the origin server. Requests arriving at the origin server do not always include an indication of the origin server; since they are sent to the origin server, they do not need to name it. A mechanism referred to as a reflector, co-located with the origin server, intercepts the request from the client to the origin server and decides whether to reflect the request or to handle it locally. If the reflector decides to handle the request locally, it forwards it to the origin server, otherwise it selects a "best" repeater to process the request. If the request is reflected, the client is provided with a modified resource identifier designating the repeater.

The client gets the modified resource identifier from the reflector and makes a request for the particular resource from the repeater designated in the modified resource identifier.

When the repeater gets the client's request, it responds by returning the requested resource to the client. If the repeater has a local copy of the resource then it returns that copy, otherwise it forwards the request to the origin server to get the resource, and saves a local copy of the resource in order to serve subsequent requests.

The selection by the reflector of an appropriate repeater to handle the request can be done in a number of ways. In the preferred embodiment, it is done by first pre-partitioning the network into "cost groups" and then determining which cost group the client is in. Next, from a plurality of repeaters in the network, a set of repeaters is selected, the members of the set having a low cost relative to the cost group which the client is in. In order to determine the lowest cost, a table is maintained and regularly updated to define the cost between each group and each repeater. Then one member of the set is selected, preferably randomly, as the best repeater.

If the particular requested resource itself can contain identifiers of other resources, then the resource may be rewritten (before being provided to the client). In particular, the resource is rewritten to replace at least some of the resource identifiers contained therein with modified resource identifiers designating a repeater instead of the origin server. As a consequence of this rewriting process, when the client requests other resources based on identifiers in the particular requested resource, the client will make those requests directly to the selected repeater, bypassing the reflector and origin server entirely.

Resource rewriting must be performed by reflectors. It may also be performed by repeaters, in the situation where repeaters "peer" with one another and make copies of resources which include rewritten resource identifiers that designate a repeater.

In a preferred embodiment, the network is the Internet and the resource identifier is a uniform resource locator (URL) for designating resources on the Internet, and the modified resource identifier is a URL designating the repeater and indicating the origin server (as described in step B3 below), and the modified resource identifier is provided to the client using a REDIRECT message. Note, only when the reflector is "reflecting" a request is the modified resource identifier provided using a REDIRECT message.

In another aspect, this invention is a computer network comprising a plurality of origin servers, at least some of the origin servers having reflectors associated therewith, and a plurality of repeaters.

BRIEF DESCRIPTION OF THE DRAWINGS

The above and other objects and advantages of the invention will be apparent upon consideration of the following detailed description, taken in conjunction with the accompanying drawings, in which the reference characters refer to like parts throughout and in which.

DETAILED DESCRIPTION OF THE PRESENTLY PREFERRED EXEMPLARY EMBODIMENTS

Overview

Figure 1:
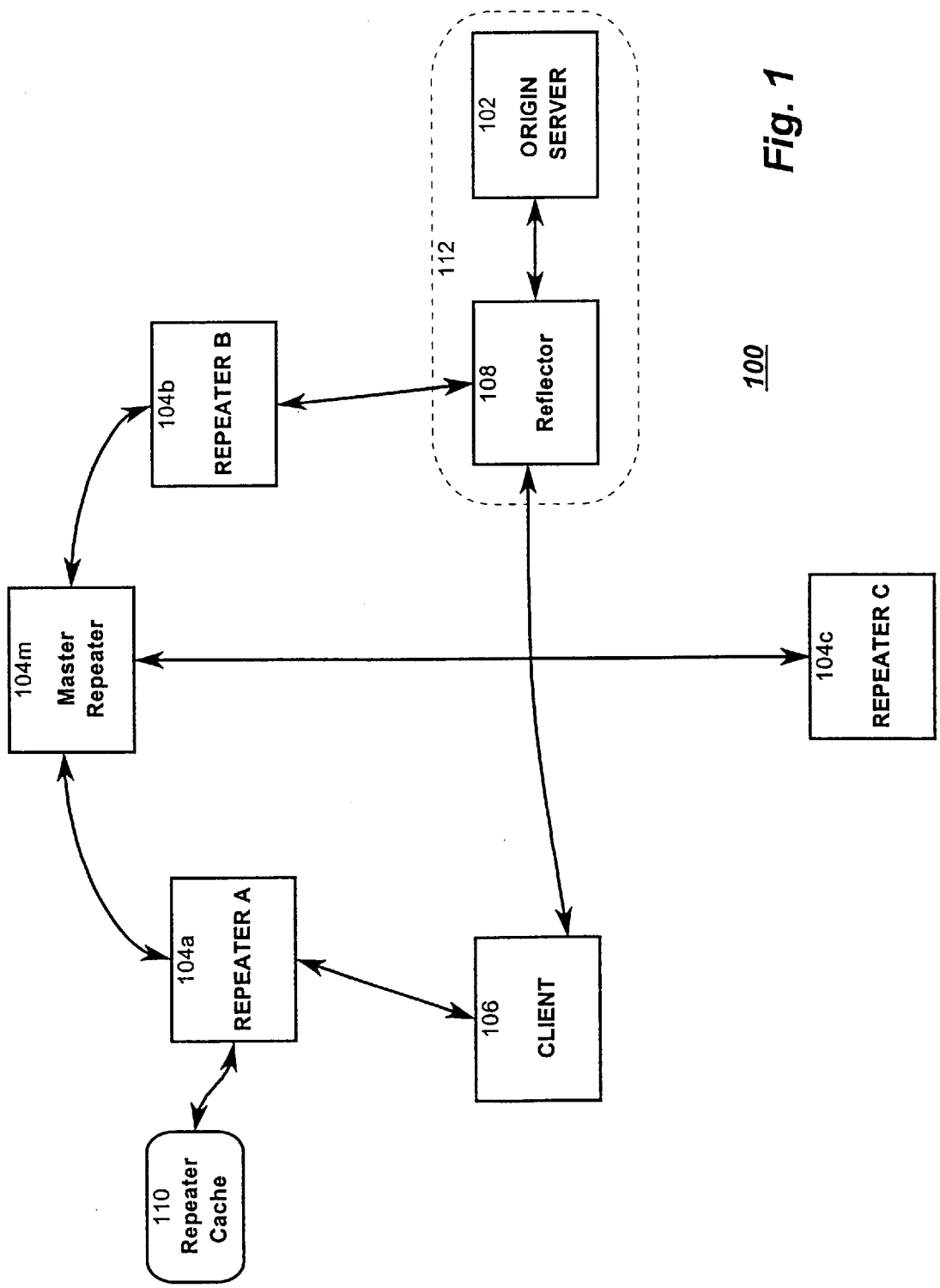
FIG. 1 depicts a portion of a network environment according to the present invention.

FIG. 1 shows a portion of a network environment 100 according to the present invention, wherein a mechanism (reflector 108, described in detail below) at a server (herein origin server 102) maintains and keeps track of a number of partially replicated servers or repeaters 104a, 104b, and 104c. Each repeater 104a, 104b, and 104c replicates some or all of the information available on the origin server 102 as well as information available on other origin servers in the network 100. Reflector 108 is connected to a particular repeater known as its "contact" repeater ("Repeater B" 104b in the system depicted in FIG. 1). Preferably each reflector maintains a connection with a single repeater known as its contact, and each repeater maintains a connection with a special repeater known as its master repeater (e.g., repeater 104m for repeaters 104a, 104b and 104c in FIG. 1).

Thus, a repeater can be considered as a dedicated proxy server that maintains a partial or sparse mirror of the origin server 102, by implementing a distributed coherent cache of the origin server. A repeater may maintain a (partial) mirror of more than one origin server. In some embodiments, the network 100 is the Internet and repeaters mirror selected resources provided by origin servers in response to clients' HTTP (hypertext transfer protocol) and FTP (file transfer protocol) requests.

A client 106 connects, via the network 100, to origin server 102 and possibly to one or more repeaters 104a etc.

Origin server 102 is a server at which resources originate. More generally, the origin server 102 is any process or collection of processes that provide resources in response to requests from a client 106. Origin server 102 can be any off-the-shelf Web server. In a preferred embodiment, origin server 102 is typically a Web server such as the Apache server or Netscape Communications Corporation's Enterprise™ server.

Client 106 is a processor requesting resources from origin server 102 on behalf of an end user. The client 106 is typically a user agent (e.g., a Web browser such as Netscape Communications Corporation's Navigator™) or a proxy for a user agent. Components other than the reflector 108 and the repeaters 104a, 104b, etc., may be implemented using commonly available software programs. In particular, this invention works with any HTTP client (e.g., a Web browser), proxy cache, and Web server. In addition, the reflector 108 might be fully integrated into the data server 112 (for instance, in a Web Server). These components might be loosely integrated based on the use of extension mechanisms (such as so-called add-in modules) or tightly integrated by modifying the service component specifically to support the repeaters.

Resources originating at the origin server 102 may be static or dynamic. That is, the resources may be fixed or they may be created by the origin server 102 specifically in response to a request. Note that the terms "static" and "dynamic" are relative, since a static resource may change at some regular, albeit long, interval.

Resource requests from the client 106 to the origin server 102 are intercepted by reflector 108 which for a given request either forwards the request on to the origin server 102 or conditionally reflects it to some repeater 104a, 104b, etc. in the network 100. That is, depending on the nature of the request by the client 106 to the origin server 102, the reflector 108 either serves the request locally (at the origin server 102), or selects one of the repeaters (preferably the best repeater for the job) and reflects the request to the selected repeater. In other words, the reflector 108 causes requests for resources from origin server 102, made by client 106, to be either served locally by the origin server 102 or transparently reflected to the best repeater 104a, 104b, etc. The notion of a best repeater and the manner in which the best repeater is selected are described in detail below.

Repeaters 104a, 104b, etc. are intermediate processors used to service client requests thereby improving performance and reducing costs in the manner described herein. Within repeaters 104a, 104b, etc., are any processes or collections of processes that deliver resources to the client 106 on behalf of the origin server 102. A repeater may include a repeater cache 110, used to avoid unnecessary transactions with the origin server 102.

The reflector 108 is a mechanism, preferably a software program, that intercepts requests that would normally be sent directly to the origin server 102. While shown in the drawings as separate components, the reflector 108 and the origin server 102 are typically co-located, e.g., on a particular system such as data server 112. (As discussed below, the reflector 108 may even be a "plug in" module that becomes part of the origin server 102.

FIG. 1 shows only a part of a network 100 according to this invention. A complete operating network consists of any number of clients, repeaters, reflectors, and origin servers. Reflectors communicate with the repeater network, and repeaters in the network communicate with one another.

Uniform Resource Locators

Each location in a computer network has an address which can generally be specified as a series of names or numbers. In order to access information, an address for that information must be known. For example, on the World Wide Web ("the Web") which is a subset of the Internet, the manner in which information address locations are provided has been standardized into Uniform Resource Locators (URLs). URLs specify the location of resources (information, data files, etc.) on the network.

The notion of URLs becomes even more useful when hypertext documents are used. A hypertext document is one which includes, within the document itself, links (pointers or references) to the document itself or to other documents. For example, in an on-line legal research system, each case may be presented as a hypertext document. When other cases are cited, links to those cases can be provided. In this way, when a person is reading a case, they can follow cite links to read the appropriate parts of cited cases.

In the case of the Internet in general and the World Wide Web specifically, documents can be created using a standardized form known as the Hypertext Markup Language (HTML). In, HTML, a document consists of data (text, images, sounds, and the like), including links to other sections of the same document or to other documents. The links are generally provided as URLs, and can be in relative or absolute form. Relative URLs simply omit the parts of the URL which are the same as for the document including the link, such as the address of the document (when linking to the same document), etc. In general, a browser program will fill in missing parts of a URL using the corresponding parts from the current document, thereby forming a fully formed URL including a fully qualified domain name, etc.

A hypertext document may contain any number of links to other documents, and each of those other documents may be on a different server in a different part of the world. For example, a document may contain links to documents in Russia, Africa, China and Australia. A user viewing that document at a particular client can follow any of the links transparently (i.e., without knowing where the document being linked to actually resides). Accordingly, the cost (in terms of time or money or resource allocation) of following one link versus another may be quite significant.

URLs generally have the following form (defined in detail in T. Berners-Lee et al, *Uniform Resource Locators* (URL), Network Working Group, Request for Comments: 1738, Category: Standards Track, December 1994, located at "http://ds.internic.net/rfc/rfc1738.txt", which is hereby incorporated herein by reference):

scheme://host[:port]/url-path where "scheme" can be a symbol such as "file" (for a file on the local system), "ftp" (for a file on an anonymous FTP file server), "http" (for a file on a file on a Web server),and "telnet" (for a connection to a Telnet-based service). Other schemes, can also be used and new schemes are added every now and then. The port number is optional, the system substituting a default port number (depending on the scheme) if none is provided. The "host" field maps to a particular network address for a particular computer. The "url-path" is relative to the computer specified in the "host" field. A url-path is typically, but not necessarily, the pathname of a file in a web server directory.

For example, the following is a URL identifying a file "F" in the path "A/B/C" on a computer at "www.uspto.gov":

http://www.uspto.gov/A/B/C/F

In order to access the file "F" (the resource) specified by the above URL, a program (e.g., a browser) running on a user's computer (i.e., a client computer) would have to first locate the computer (i.e., a server computer) specified by the host name. I.e., the program would have to locate the server "www.uspto.gov". To do this, it would access a Domain Name Server (DNS), providing the DNS with the host name ("www.uspto.gov"). The DNS acts as a kind of centralized directory for resolving addresses from names. If the DNS determines that there is a (remote server) computer corresponding to the name "www.upto.gov", it will provide the program with an actual computer network address for that server computer. On the Internet this is called an Internet Protocol (or IP) address and it has the form "123.345.456.678". The program on the user's (client) computer would then use the actual address to access the remote (server) computer.

The program opens a connection to the HTTP server. (Web server) on the remote computer "www.uspto.gov" and uses the connection to send a request message to the remote computer (using the HTTP scheme). The message is typically an HTTP GET request which includes the url-path of the requested resource, "A/B/C/F". The HTTP server receives the request and uses it to access the resource specified by the url-path "A/B/C/F". The server returns the resource over the same connection.

Thus, conventionally HTTP client requests for Web resources at an origin server 102 are processed as follows (see FIG. 2) (This is a description of the process when no reflector 108 is installed.):

A1. A browser (e.g., Netscape's Navigator) at the client receives a resource identifier (i.e., a URL) from a user.

A2. The browser extracts the host (origin server) name from the resource identifier, and uses a domain name server (DNS) to look up the network (IP) address of the corresponding server. The browser also extracts a port number, if one is present, or uses a default port number (the default port number for http requests is 80).

A3. The browser uses the server's network address and port number to establish a connection between the client 106 and the host or origin server 102.

A4. The client 106 then sends a (GET) request over the connection identifying the requested resource.

A5. The origin server 102 receives the request and

A6. locates or composes the corresponding resource.

A7. The origin server 102 then sends back to the client 106 a reply containing the requested resource (or some form of error indicator if the resource is unavailable). The reply is sent to the client over the same connection as that on which the request was received from the client.

A8. The client 106 receives the reply from the origin server 102.

There are many variations of this basic model. For example, in one variation, instead of providing the client with the resource, the origin server can tell the client to re-request the resource by another name. To do so, in A7 the server 102 sends back to the client 106 a reply called a "REDIRECT" which contains a new URL indicating the other name. The client 106 then repeats the entire sequence, normally without any user intervention, this time requesting the resource identified by the new URL.

System Operation

In this invention reflector 108 effectively takes the place of an ordinary Web server or origin server 102. The reflector 108 does this by taking over the origin server's IP address and port number. In this way, when a client tries to connect to the origin server 102, it will actually connect to the reflector 108. The original Web server (or origin server 102) must then accept requests at a different network (IP) address, or at the same IP address but on a different port number. Thus, using this invention, the server referred to in A3–A7 above is actually a reflector 108.

Note that it is also possible to leave the origin server's network address as it is and to let the reflector run at a different address or on a different port. In this way the reflector does not intercept requests sent to the origin server, but can still be sent requests addressed specifically to the reflector. Thus the system can be tested and configured without interrupting its normal operation.

Figure 3:
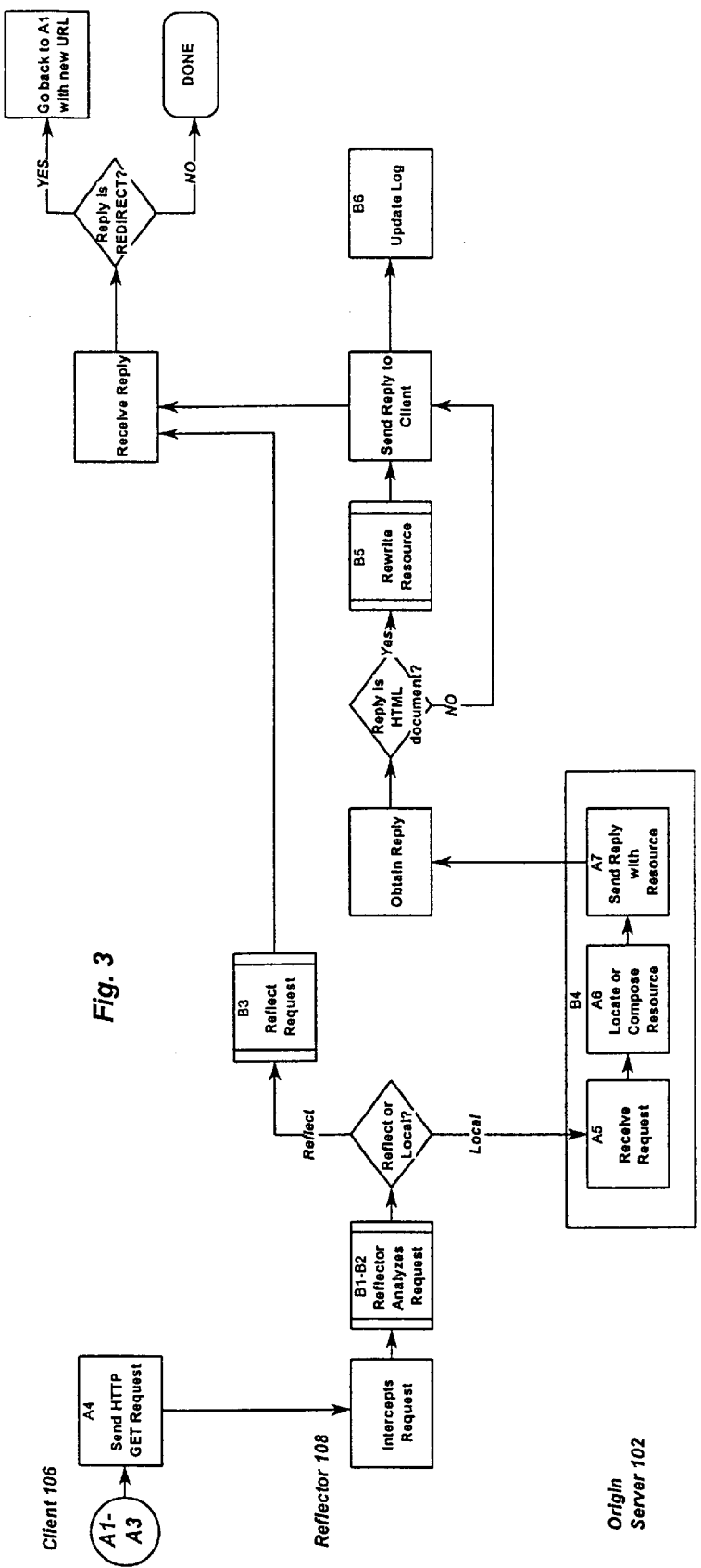

The reflector 108 supports the processing as follows (see FIG. 3): upon receipt of a request, B1. The reflector 108 analyzes the request to determine whether or not to reflect the request. To do this, first the reflector determines whether the sender (client 106) is a browser or a repeater. Requests issued by repeaters must be served locally by the origin server 102. This determination can be made by looking up the network (IP) address of the sender in a list of known repeater network (IP) addresses. Alternatively, this determination could be made by attaching information to a request to indicate that the request is from a specific repeater, or repeaters can request resources from a special port other than the one used for ordinary clients.

B2. If the request is not from a repeater, the reflector looks up the requested resource in a table (called the "rule base") to determine whether the resource requested is "repeatable". Based on this determination, the reflector either reflects the request (B3, described below) or serves the request locally (B4, described below).

The rule base is a list of regular expressions and associated attributes. (Regular expressions are well-known in the field of computer science. A small bibliography of their use is found in Aho, et al., "Compilers, Principles, techniques and tools", Addison-Wesley, 1986, pp. 157–158.) The resource identifier (URL) for a given request is looked up in the rule base by matching it sequentially with each regular expression. The first match identifies the attributes for the resource, namely repeatable or local. If there is no match in the rule base, a default attribute is used. Each reflector has its own rule base, which is manually configured by the reflector operator.

Figure 4:
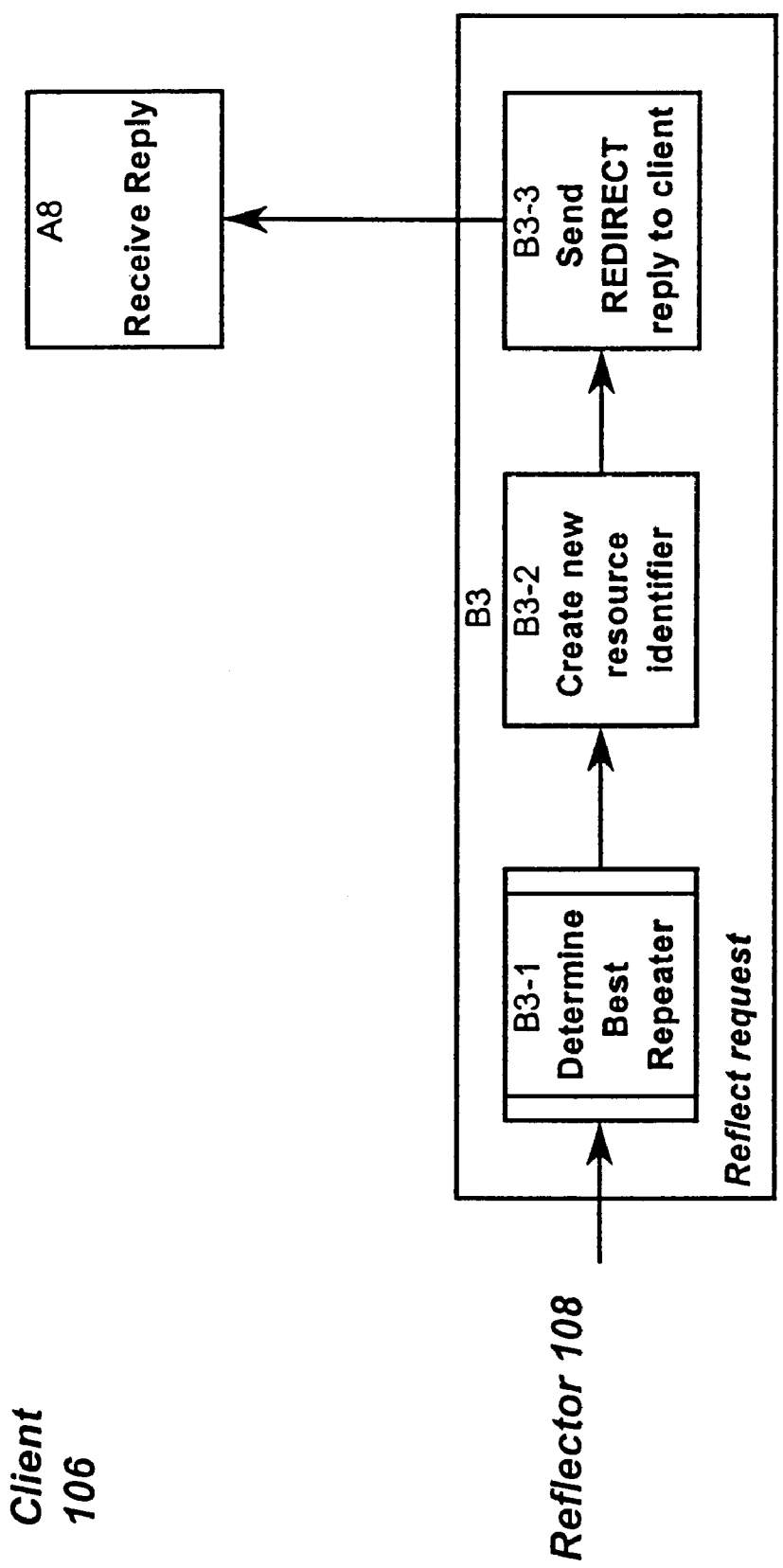

B3. To reflect a request, (to serve a request locally go to B4), as shown in FIG. 4, the reflector determines (B3-1) the best repeater to reflect the request to, as described in detail below. The reflector then creates (B3-2) a new resource identifier (URL) (using the requested URL and the best repeater) that identifies the same resource at the selected repeater.

It is necessary that the reflection step create a single URL containing the URL of the original resource, as well as the identity of the selected repeater. A special form of URL is created to provide this information. This is done by creating a new URL as follows:

D1. Given a repeater name, scheme, origin server name and path, create a new URL. If the scheme is "http", the preferred embodiment uses the following format:

http://<repeater>/<server>/<path>

If the form used is other than "http", the preferred embodiment uses the following format:

http://<repeater>/<server>@proxy=<scheme>@/<path>

The reflector can also attach a MIME type to the request, to cause the repeater to provide that MIME type with the result. This is useful because many protocols (such as FTP) do not provide a way to attach a MIME type to a resource. The format is http://<repeater>/<server>@proxy=<scheme>:<type>@/<path>

This URL is interpreted when received by the repeater.

The reflector then sends (B3-3) a REDIRECT reply containing this new URL to the requesting client. The HTTP REDIRECT command allows the reflector to send the browser a single URL to retry the request.

B4. To serve a request locally, the request is sent by the reflector to ("forwarded to") the origin server 102. In this mode, the reflector acts as a reverse proxy server.

The origin server 102 processes the request in the normal manner (A5–A7). The reflector then obtains the origin server's reply to the request which it inspects to determine if the requested resource is an HTML document, i.e., whether the requested resource is one which itself contains resource identifiers.

B5. If the resource is an HTML document then the reflector rewrites the HTML document by modifying resource identifiers (URLs) within it, as described below. The resource, possibly as modified by rewriting, is then returned in a reply to the requesting client 106.

If the requesting client is a repeater, the reflector may temporarily disable any cache-control modifiers which the origin server attached to the reply. These disabled cache-control modifiers are later re-enabled when the content is served from the repeater. This mechanism makes it possible for the origin server to prevent resources from being cached at normal proxy caches, without affecting the behavior of the cache at the repeater.

B6. Whether the request is reflected or handled locally, details about the transaction, such as the current time, the address of the requester, the URL requested, and the type of response generated, are written by the reflector to a local log file.

By using a rule base (B2), it is possible to selectively reflect resources. There are a number of reasons that certain particular resources cannot be effectively repeated (and therefore should not be reflected), for instance:

the resource is composed uniquely for each request;

the resource relies on a so-called cookie (browsers will not send cookies to repeaters with different domain names);

the resource is actually a program (such as a Java applet) that will run on the client and that wishes to connect to a service Java requires that the service be running on the same machine that provided the applet).

In addition, the reflector 108 can be configured so that requests from certain network addresses (e.g., requests from clients on the same local area network as the reflector itself) are never reflected. Also, the reflector may choose not to reflect requests because the reflector is exceeding its committed aggregate information rate, as described below.

A request which is reflected is automatically mirrored at the repeater when the repeater receives and processes the request.

The combination of the reflection process described here and the caching process described below effectively creates a system in which repeatable resources are migrated to and mirrored at the selected reflector, while non-repeatable resources are not mirrored.

Alternate Approach

Placing the origin server name in the reflected URL is generally a good strategy, but it may be considered undesirable for aesthetic or (in the case, e.g., of cookies) certain technical reasons.

It is possible to avoid the need for placing both the repeater name and the server name in the URL. Instead, a "family" of names may be created for a given origin server, each name identifying one of the repeaters used by that server.

For instance, if www.example.com is the origin server, names for three repeaters might be created:

wr1.example.com
wr2.example.com
wr3.example.com

The name "wr1.example.com" would be an alias for repeater 1, which might also be known by other names such as "wr1.anotherExample.com" and "wr1.example.edu".

If the repeater can determine by which name it was addressed, it can use this information (along with a table that associates repeater alias names with origin server names) to determine which origin server is being addressed. For instance, if repeater 1 is addressed as wr1.example.com, then the origin server is "www.example.com"; if it is addressed as "wr1.anotherExample.com", then the origin server is "www.anotherExample.com".

The repeater can use two mechanisms to determine by which alias it is addressed:

1. Each alias can be associated with a different IP address. Unfortunately, this solution does not scale well, as IP addresses are currently scarce, and the number of IP addresses required grows as the product of origin servers and repeaters.

2. The repeater can attempt to determine the alias name used by inspecting the "host:" tag in the HTTP header of the request. Unfortunately, some old browsers still in use do not attach the "host:" tag to a request. Reflectors would need to identify such browsers (the browser identity is a part of each request) and avoid this form of reflection.

How a Repeater Handles a Request

Figure 5:
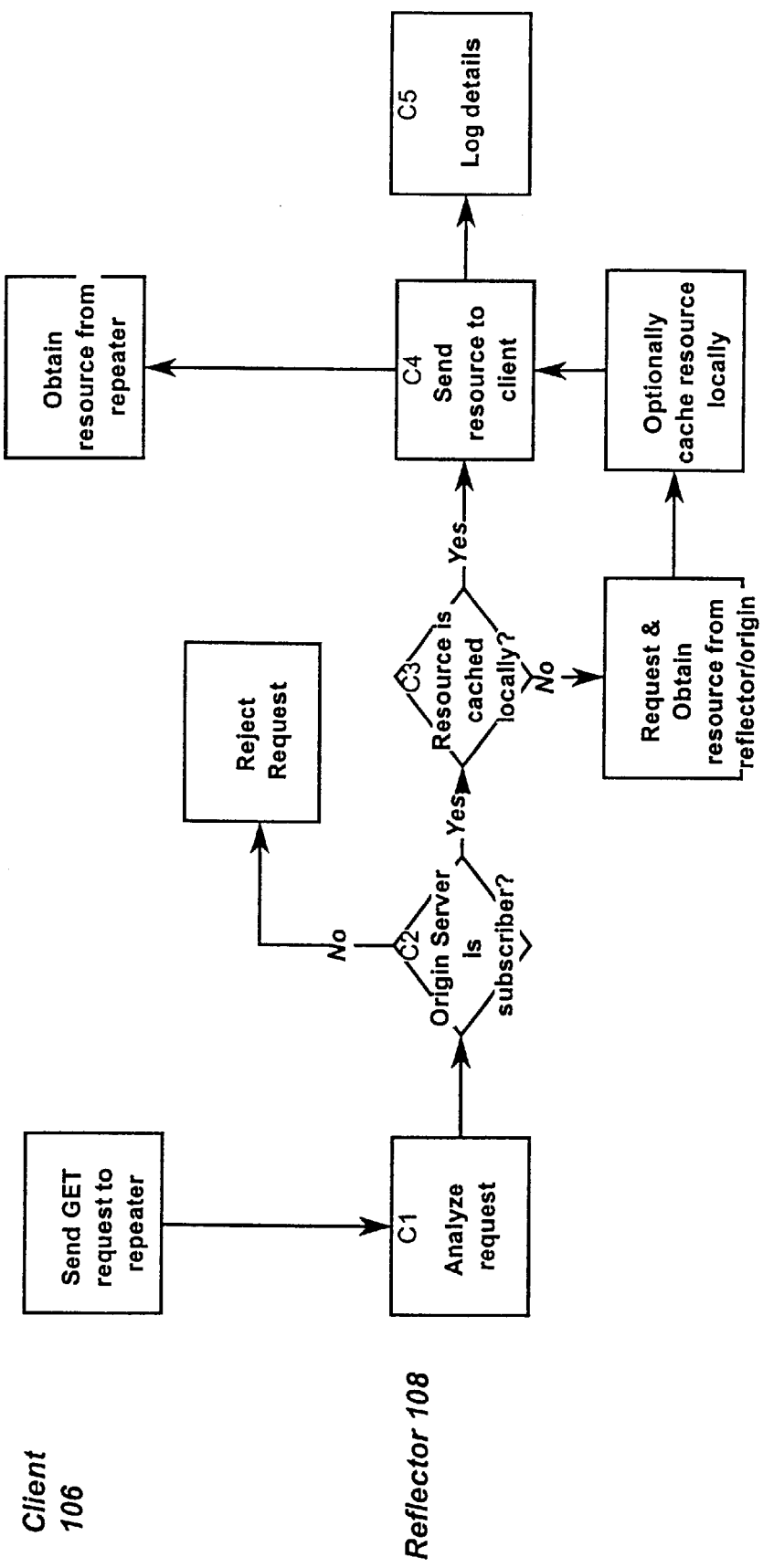

When a browser receives a REDIRECT response (as produced in B3), it reissues a request for the resource using the new resource identifier (URL) (A1–A5). Because the new identifier refers to a repeater instead of the origin server, the browser now sends a request for the resource to the repeater which processes a request as follows, with reference to FIG. 5:

C1. First the repeater analyzes the request to determine the network address of the requesting client and the path of the resource requested. Included in the path is an origin server name (as described above with reference to B3).

C2. The repeater uses an internal table to verify that the origin server belongs to a known "subscriber". A subscriber is an entity (e.g., a company) that publishes resources (e.g., files) via one or more origin servers. When the entity subscribes, it is permitted to utilize the repeater network. The subscriber tables described below include the information that is used to link reflectors to subscribers.

If the request is not for a resource from a known subscriber, the request is rejected. To reject a request, the repeater returns a reply indicating that the requested resource does not exist.

C3. The repeater then determines whether the requested resource is cached locally. If the requested resource is in the repeater's cache it is retrieved. On the other hand, if a valid copy of the requested resource is not in the repeater's cache, the repeater modifies the incoming URL, creating a request that it issues directly to the originating reflector which processes it (as in B1–B6). Because this request to the originating reflector is from a repeater, the reflector always returns the requested resource rather than reflecting the request (Recall that reflectors always handle requests from repeaters locally.) If the repeater obtained the resource from the origin server, the repeater then caches the resource locally.

If a resource is not cached locally, the cache can query its "peer caches" to see if one of them contains the resource, before or at the same time as requesting the resource from the reflector/origin server. If a peer cache responds positively in a limited period of time (preferably a small fraction of a second), the resource will be retrieved from the peer cache.

C4. The repeater then constructs a reply including the requested resource (which was retrieved from the cache or from the origin server) and sends that reply to the requesting client.

C5. Details about the transaction, such as the associated reflector, the current time, the address of the requester, the URL requested, and the type of response generated, are written to a local log file at the repeater.

Figure 2:
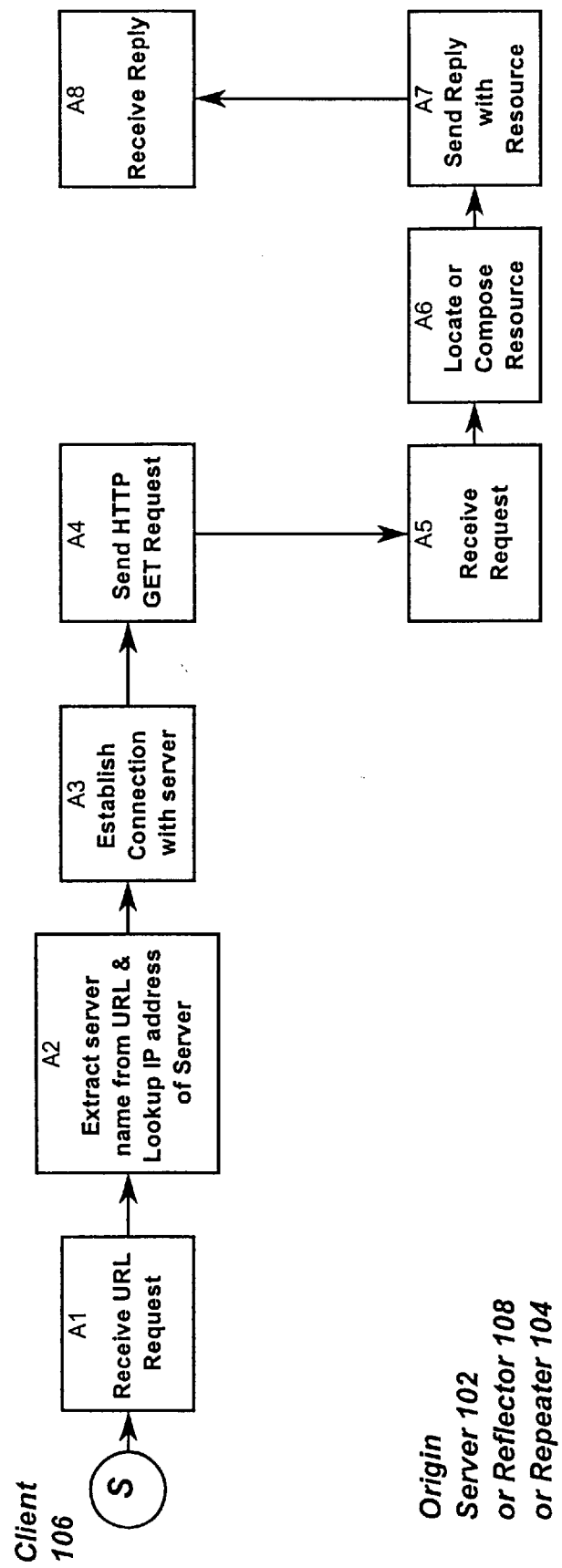
FIGS. 2–6 are flow charts of the operation of the present invention.

Note that the bottom row of FIG. 2 refers to an origin server, or a reflector, or a repeater, depending on what the URL in step A1 identifies.

Selecting the Best Repeater

If the reflector 108 determines that it will reflect the request, it must then select the best repeater to handle that request (as referred to in step B3-1). This selection is performed by the Best Repeater Selector (BRS) mechanism described here.

The goal of the BRS is to select, quickly and heuristically, an appropriate repeater for a given client given only the network address of the client. An appropriate repeater is one which is not too heavily loaded and which is not too far from the client in terms of some measure of network distance. The mechanism used here relies on specific, compact, pre-computed data to make a fast decision. Other, dynamic solutions can also be used to select an appropriate repeater.

The BRS relies on three pre-computed tables, namely the Group Reduction Table, the Link Cost Table, and the Load Table. These three tables (described below) are computed off-line and downloaded to each reflector by its contact in the repeater network.

The Group Reduction Table places every network address into a group, with the goal that addresses in a group share relative costs, so that they would have the same best repeater under varying conditions (i.e., the BRS is invariant over the members of the group).

The Link Cost Table is a two dimensional matrix which specifies the current cost between each repeater and each group. Initially, the link cost between a repeater and a group is defined as the "normalized link cost" between the repeater and the group, as defined below. Over time, the table will be updated with measurements which more accurately reflect the relative cost of transmitting a file between the repeater and a member of the group. The format of the Link Cost Table is <Group ID> <Group ID> <link cost>, where the Group ID's are given as AS numbers.

The Load Table is a one dimensional table which identifies the current load at each repeater. Because repeaters may have different capacities, the load is a value that represents the ability of a given repeater to accept additional work. Each repeater sends its current load to a central master repeater at regular intervals, preferably at least approximately once a minute. The master repeater broadcasts the Load Table to each reflector in the network, via the contact repeater.

A reflector is provided entries in the Load Table only for repeaters which it is assigned to use. The assignment of repeaters to reflectors is performed centrally by a repeater network operator at the master repeater. This assignment makes it possible to modify the service level of a given reflector. For instance, a very active reflector may use many repeaters, whereas a relatively inactive reflector may use few repeaters.

Tables may also be configured to provide selective repeater service to subscribers in other ways, e.g., for their clients in specific geographic regions, such as Europe or Asia.

Measuring Load

In the presently preferred embodiments, repeater load is measured in two dimensions, namely 1. requests received by the repeater per time interval (RRPT), and
2. bytes sent by the repeater per time interval (BSPT).

For each of these dimensions, a maximum capacity setting is set. The maximum capacity indicates the point at which the repeater is considered to be fully loaded. A higher RRPT capacity generally indicates a faster processor, whereas a higher BSPT capacity generally indicates a wider network pipe. This form of load measurement assumes that a given server is dedicated to the task of repeating.

Each repeater regularly calculates its current RRPT and BSPT, by accumulating the number of requests received and bytes sent over a short time interval. These measurements are used to determine the repeater's load in each of these dimensions. If a repeater's load exceeds its configured capacity, an alarm message is sent to the repeater network administrator.

The two current load components are combined into a single value indicating overall current load. Similarly, the two maximum capacity components are combined into a single value indicating overall maximum capacity. The components are combined as follows:

$$\text{current-load} = B \times \text{current } RRPT + (1-B) \times \text{current } BSPT$$

$$\text{max-load} = B \times \text{max } RRPT + (1-B) \times \text{max } BSPT$$

The factor B, a value between 0 and 1, allows the relative weights of RRPT and BSPT to be adjusted, which favors consideration of either processing power or bandwidth.

The overall current load and overall maximum capacity values are periodically sent from each repeater to the master repeater, where they are aggregated in the Load Table, a table summarizing the overall load for all repeaters. Changes in the Load Table are distributed automatically to each reflector.

While the preferred embodiment uses a two-dimensional measure of repeater load, any other measure of load can be used.

Combining Link Costs and Load

The BRS computes the cost of servicing a given client from each eligible repeater. The cost is computed by combining the available capacity of the candidate repeater with the cost of the link between that repeater and the client. The link cost is computed by simply looking it up in the Link Cost table.

The cost is determined using the following formula:

$$\text{threshold} = K^* \text{max-load}$$

$$\text{capacity} = \max(\text{max-load} - \text{current-load}, e)$$

$$\text{capacity} = \min(\text{capacity}, \text{threshold})$$

$$\text{cost} = \text{link-cost}^* \text{threshold}/\text{capacity}$$

In this formula, e is a very small number (epsilon) and K is a tuning factor initial set to 0.5. This formula causes the cost to a given repeater to be increased, at a rate defined by K, if its capacity falls below a configurable threshold.

Given the cost of each candidate repeater, the BRS selects all repeaters within a delta factor of the best score. From this set, the result is selected at random.

The delta factor prevents the BRS from repeatedly selecting a single repeater when scores are similar. It is generally required because available information about load and link costs loses accuracy over time. This factor is tunable.

Best Repeater Selector (BRS)

Figure 6:
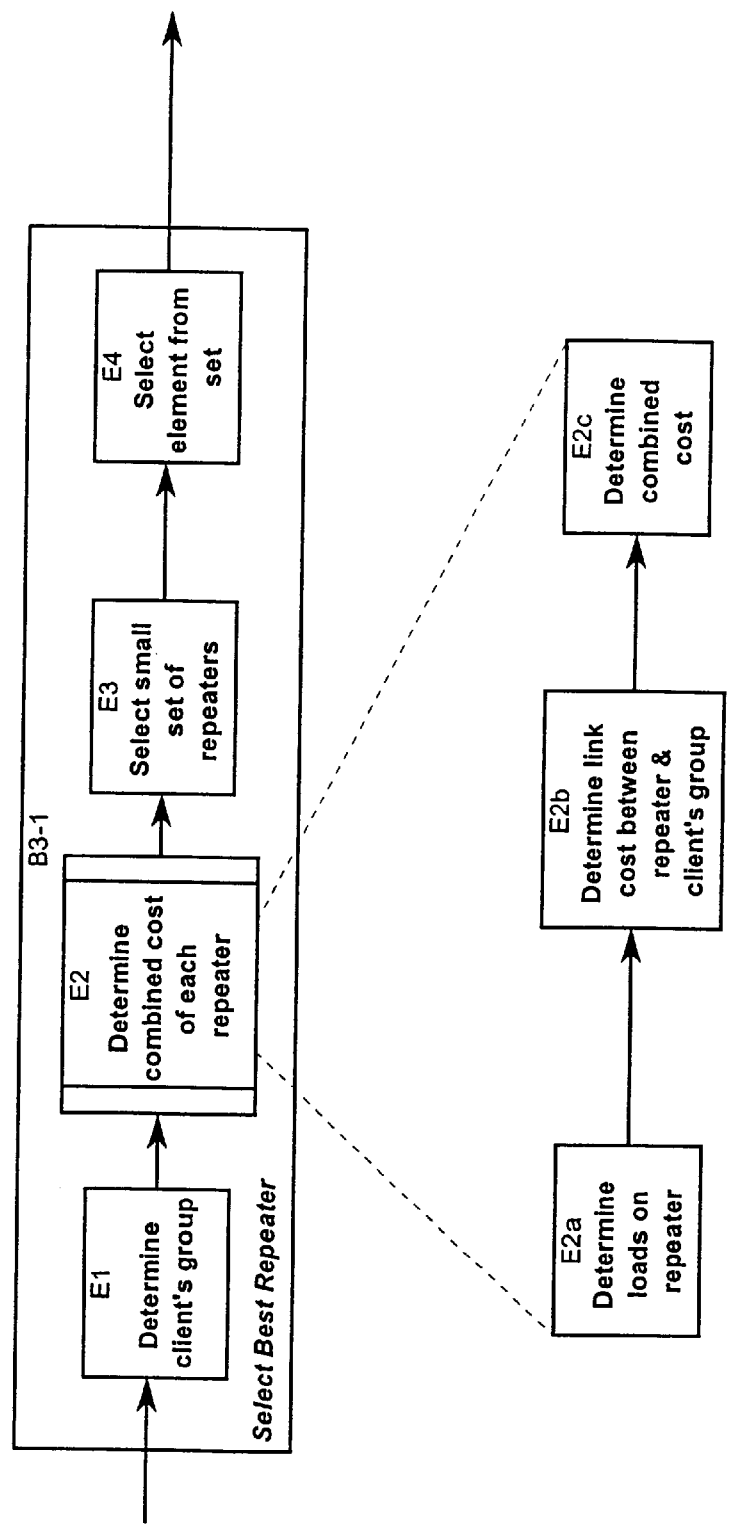

The BRS operates as follows, with reference to FIG. 6:

Given a client network address and the three tables described above:

E1. Determine which group the client is in using the Group Reduction Table.

E2. For each repeater in the Link Cost Table and Load Table, determine that repeater's combined cost as follows:

E2a. Determine the maximum and current load on the repeater (using the Load Table).

E2b. Determine the link cost between the repeater and the client's group (using the Link Cost Table).

E2c. Determine the combined cost as described above.

E3. Select a small set of repeaters with the lowest cost.

E4. Select a random member from the set

Preferably the results of the BRS processing are maintained in a local cache at the reflector 108. Thus, if the best repeater has recently been determined for a given client (i.e., for a given network address), that best repeater can be reused quickly without being re-determined. Since the calculation described above is based on statically, pre-computed tables, if the tables have not changed then there is no need to re-determine the best repeater.

Determining the Group Reduction and Link Cost Tables

The Group Reduction Table and Link Cost Table used in BRS processing are created and regularly updated by an independent procedure referred to herein as NetMap. The NetMap procedure is run by executing several phases (described below) as needed.

The term Group is used here to refers to an IP "address group".

The term Repeater Group refers to a Group that contains the IP address of a repeater.

The term link cost refers to a statically determined cost for transmitting data between two Groups. In a presently preferred implementation, this is the minimum of the sums of the costs of the links along each path between them. The link costs of primary concern here are link costs between a Group and a Repeater Group.

The term relative link cost refers to the link cost relative to other link costs for the same Group which is calculated by subtracting the minimum link cost from a Group to any Repeater Group from each of its link costs to a Repeater Group. The term Cost Set refers to a set of Groups that are equivalent in regard to Best Repeater Selection. That is, given the information available, the same repeater would be selected for any of them.

The NetMap procedure first processes input files to create an internal database called the Group Registry. These input files describe groups, the IP addresses within groups, and links between groups, and come a variety of sources, including publicly available Internet Routing Registry (IRR) databases, BGP router tables, and probe services that are located at various points around the Internet and use publicly available tools (such as "traceroute") to sample data paths. Once this processing is complete, the Group Registry contains essential information used for further processing, namely (1) the identity of each group, (2) the set of IP addresses in a given group, (3) the presence of links between groups indicating paths over which information may travel, and (4) the cost of sending data over a given link.

The following processes are then performed on the Group Registry file.

Calculate Repeater Group Link Costs

The NetMap procedure calculates a "link cost" for transmission of data between each Repeater Group and each Group in the Group Registry. This overall link cost is defined as the minimum cost of any path between the two groups, where the cost of a path is equal to the sum of the costs of the individual links in the path. The link cost algorithm presented below is essentially the same as algorithm #562 from ACM journal Transactions on Mathematical Software: "Shortest Path From a Specific Node to All Other Nodes in a Network" by U. Pape, ACM TOMS 6 (1980) pp. 450–455, http://wwww.netlib.org/toms/562.

In this processing, the term Repeater Group refers to a Group that contains the IP address of a repeater. A group is a neighbor of another group if the Group Registry indicates that there is a link between the two groups.

For each target Repeater Group T:
Initialize the link cost between T and itself to zero.
Initialize the link cost between T and every other Group to infinity.
Create a list L that will contain Groups that are equidistant from the target Repeater Group T.
Initialize the list L to contain just the target Repeater Group T itself.
Wile the list L is not empty.
Create an empty list L' of neighbors of members of the list L.
For each Group G in the list L:
For each Group N that is a neighbor of G:
Let cost refer to the sum of the link cost between T and G, and the link cost between G and N. The cost between T and G was determined in the previous pass of the algorithm; the link cost between G and N is from the Group Registry.
If cost is less than the link cost between T and N:
Set the link cost between T and N to cost.
Add N to L' if it is not already on it.
Set L to L'.

Calculate Cost Sets

A Cost Set is a set of Groups that are equivalent with respect to Best Repeater Selection. That is, given the information available, the same repeater would be selected for any of them.

The "cost profile" of a Group G is defined herein as the set of costs between G and each Repeater. Two cost profiles are said to be equivalent if the values in one profile differ from the corresponding values in the other profile by a constant amount.

Once a client Group is known, the Best Repeater Selection algorithm relies on the cost profile for information about the Group. If two cost profiles are equivalent, the BRS algorithm would select the same repeater given either profile.

A Cost Set is then a set of groups that have equivalent cost profiles.

The effectiveness of this method can be seen, for example, in the case where all paths to a Repeater from some Group A pass through some other Group B. The two Groups have equivalent cost profiles (and are therefore in the same Cost Set) since whatever Repeater is best for Group A is also going to be best for Group B, regardless of what path is taken between the two Groups.

By normalizing cost profiles, equivalent cost profiles can be made identical. A normalized cost profile is a cost profile in which the minimum cost has the value zero. A normalized cost profile is computed by finding the minimum cost in the profile, and subtracting that value from each cost in the profile.

Cost Sets are then computed using the following algorithm:

For each Group G:
  Calculate the normalized cost profile for G
  Look for a Cost Set with the same normalized cost profile.
  If such as set is found, add G to the existing Cost Set; otherwise, create a new Cost Set with the calculated normalized cost profile, containing only G.

The algorithm for finding Cost Sets employs a hash table to reduce the time necessary to determine whether the desired Cost Set already exists. The hash table uses a hash value computed from cost profile of G.

Each Cost Set is then numbered with a unique Cost Sent Index number. Cost Sets are then used in a straightforward manner to generate the Link Cost Table, which gives the cost from each Cost Set to each Repeater.

As described below, the Group Reduction Table maps every IP address to one of these Cost Sets.

Build IP Map

The IP Map is a sorted list of records which map IP address ranges to Link Cost Table keys. The format of the IP map is:

<base IP address> <max IP address> <Link Cost Table key> where IP addresses are presently represented by 32-bit integers. The entries are sorted by descending base address, and by ascending maximum address among equal base addresses, and by ascending Link Cost Table key among equal base addresses and maximum addresses. Note that ranges may overlap.

The NetMap procedure generates an intermediate IP map containing a map between IP address ranges and Cost Set numbers as follows:

For each Cost Set S:
  For each Group G in S:
    For each IP address range in G:
      Add a triple flow address, high address, Cost Set number of S) to the IP map.

The IP map file is then sorted by descending base address, and by ascending maximum address among equal base addresses, and by ascending Cost Set number among equal base addresses and maximum addresses. The sort order for the base address and maximum address minimizes the time to build the Group Reduction Table and produces the proper results for overlapping entries.

Finally, the NetMap procedure creates the Group Reduction Table by processing the sorted IP map. The Group Reduction Table maps IP addresses (specified by ranges) into Cost Set numbers. Special processing of the IP map file is required in order to detect overlapping address ranges, and to merge adjacent address ranges in order to minimize the size of the Group Reduction Table.

An ordered list of address range segments is maintained, each segment consisting of a base address B and a Cost Set number N, sorted by base address B. (The maximum address of a segment is the base address of the next segment minus one.)

The following algorithm is used:
Initialize the list with the elements [−infinity, NOGROUP], [+infinity, NOGROUP].
  For each entry in the IP map, in sorted order, consisting of (b, m, s),
    Insert (b, m, s) in the list (recall that IP map entries are of the form (low address, high address Cost Set number of S))
  For each reserved LAN address range (b, m):
    Insert (b, m, LOCAL) in the list.
  For each Repeater at address a:
    Insert (a, a, REPEATER) in the list.
  For each segment S in the ordered list:
    Merge S with following segments with the same Cost Set
    Create a Group Reduction Table entry with base address from the base address of S,
      max address=next segment's base −1,
      group ID=Cost Set number of S.

A reserved LAN address range is an address range reserved for use by LANs which should not appear as a global Internet address. LOCAL is a special Cost Set index different from all others, indicating that the range maps to a client which should never be reflected. REPEATER is a special Cost Set index different from all others, indicating that the address range maps to a repeater. NOGROUP is a special Cost Set index different from all others, indicating that this range of addresses has no known mapping.

Given (B, M, N), insert an entry in the ordered address list as follows:
Find the last segment (AB, AN) for which AB is less than or equal to B.
If AB is less than B, insert a new segment (B, N) after (AB, AN).
Find the last segment (YB, YN) for which YB is less than or equal to M.
Replace by (XB, N) any segment (XB, NOGROUP) for which XB is greater than B and less than YB.
If YN is not N, and either YN is NOGROUP or YB is less than or equal to B,
  Let (ZB, ZN) be the segment following (YB, YN).
  If M+1 is less than ZB, insert a new segment (M+1, YN) before (ZB, ZN).
  Replace (YB, YN) by (YB, N).

Rewriting HTML Resources

As explained above with reference to FIG. 3 (B5), when a reflector or repeater serves a resource which itself includes resource identifiers (e.g., a HTML resource), that resource is modified (rewritten) to pre-reflect resource identifiers (URLs) of repeatable resources that appear in the resource. Rewriting ensures that when a browser requests repeatable resources identified by the requested resource, it gets them from a repeater without going back to the origin server, but when it requests non-repeatable resources identified by the requested resource, it will go directly to the origin server. Without this optimization, the browser would either make all requests at the origin server (increasing traffic at the origin server and necessitating far more redirections from the origin server), or it would make all requests at the repeater (causing the repeater to redundantly request and copy resources which could not be cached, increasing the overhead of serving such resources).

Rewriting requires that a repeater has been selected (as described above with reference to the Best Repeater Selector). Rewriting uses a so-called BASE directive. The BASE directive lets the HTML identify a different base server. (The base address is normally the address of the HTML resource.)

Rewriting is performed as follows:

F1. A BASE directive is added at the beginning of the HTML resource, or modified where necessary. Normally, a browser interprets relative URLs as being relative to the default base address, namely, the URL of the HTML resource (page) in which they are encountered. The BASE address added specifies the resource at the reflector which originally served the resource. This means that unprocessed relative URLs (such as those generated by Javascript™ programs) will be interpreted as relative to the reflector. Without this BASE address, browsers would combine relative addresses with repeater names to create URLs which were not in the form required by repeaters (as described above in step D1).

F2. The rewriter identifies directives, such as embedded images and anchors, containing URLs. If the rewriter is running in a reflector, it must parse the HTML file to identify these directives.

If it is running in a repeater, the rewriter may have access to pre-computed information that identifies the location of each URL placed in the HTML file in step F4).

F3. For each URL encountered in the resource to be re-written, the rewriter must determine whether the URL is repeatable (as in steps B1–B2). If the URL is not repeatable, it is not modified. On the other hand, if the URL is repeatable, it is modified to refer to the selected repeater.

F4. After all URLs have been identified and modified, if the resource is being served to a repeater, a table is appended at the beginning of the resource that identifies the location and content of each URL encountered in the resource. (This step is an optimization which eliminates the need for parsing HTML resources at the repeater.)

F5. Once all changes have been identified, a new length is computed for the resource (page). The length is inserted in the HTTP header prior to serving the resource.

An extension of HTML, known as XML, is currently being developed. The process of rewriting URLs will be similar for XML, with some differences in the mechanism that parses the resource and identifies embedded URLs.

Handling Non-HTTP Protocols

This invention makes it possible to reflect references to resources that are served by protocols other than HTTP, for instance, the File Transfer Protocol (FTP) and audio/video stream protocols. However, many protocols do not provide the ability to redirect requests. It is, however, possible to redirect references before requests are actually made by rewriting URLs embedded in HTML pages. The following modifications to the above algorithms are used to support this capability.

In F4, the rewriter rewrites URLs for servers if those servers appear in a configurable table of cooperating origin server or so-called co-servers. The reflector operator can define this table to include FTP servers and other servers. A rewritten URL that refers to a non-HTTP resource takes the form:

http://<repeater>/<origin server>@proxy=<scheme>[:<type>]@/resource where <scheme> is a supported protocol name such as "ftp". This URL format is an alternative to the form shown in B3.

In C3, the repeater looks for a protocol embedded in the arriving request. If a protocol is present and the requested resource is not already cached, the repeater uses the selected protocol instead of the default HTTP protocol to request the resource when serving it and storing it in the cache.

System Configuration and Management

In addition to the processing described above, the repeater network requires various mechanisms for system configuration and network management. Some of these mechanisms are described here.

Reflectors allow their operators to synchronize repeater caches by performing publishing operations. The process of keeping repeater caches synchronized is described below. Publishing indicates that a resource or collection of resources has changed.

Repeaters and reflectors participate in various types of log processing. The results of logs collected at repeaters are collected and merged with logs collected at reflectors, as described below.

Adding Subscribers to the Repeater Network

When a new subscriber is added to the network, information about the subscriber is entered in a Subscriber Table at the master repeater and propagated to all repeaters in the network. This information includes the Committed Aggregate Information Rate (CAIR) for servers belonging to the subscriber, and a list of the repeaters that may be used by servers belonging to the subscriber.

Adding Reflectors to the Repeater Network

When a new reflector is added to the network, it simply connects to and announces itself to a contact repeater, preferably using a securely encrypted certificate including the repeater's subscriber identifier.

The contact repeater determines whether the reflector network address is permitted for this subscriber. If it is, the contact repeater accepts the connection and updates the reflector with all necessary tables (using version numbers to determine which tables are out of date).

The reflector processes requests during this time, but is not "enabled" (allowed to reflect requests) until all of its tables are current.

Keeping Repeater Caches Synchronized

Repeater caches are coherent, in the sense that when a change to a resource is identified by a reflector, all repeater caches are notified, and accept the change in a single transaction.

Only the identifier of the changed resource (and not the entire resource) is transmitted to the repeaters; the identifier is used to effectively invalidate the corresponding cached resource at the repeater. This process is far more efficient than broadcasting the content of the changed resource to each repeater.

A repeater will load the newly modified resource the next time it is requested.

A resource change is identified at the reflector either manually by the operator, or through a script when files are installed on the server, or automatically through a change detection mechanism (e.g., a separate process that checks regularly for changes).

A resource change causes the reflector to send an "invalidate" message to its contact repeater, which forwards the message to the master repeater. The invalidate message contains a list of resource identifiers (or regular expressions identifying patterns of resource identifiers) that have changed. (Regular expressions are used to invalidate a directory or an entire server.) The repeater network uses a two-phase commit process to ensure that all repeaters correctly invalidate a given resource.

The invalidation process operates as follows:

The master broadcasts a "phase 1" invalidation request to all repeaters indicating the resources and regular expressions describing sets of resources to be invalidated.

When each repeater receives the phase 1 message, it first places the resource identifiers or regular expressions into a list of resource identifiers pending invalidation.

Any resource requested (in C3) that is in the pending invalidation list may not be served from the cache. This prevents the cache from requesting the resource from a peer cache which may not have received an invalidation notice. Were it to request a resource in this manner, it might replace the newly invalidated resource by the same, now stale, data.

The repeater then compares the resource identifier of each resource in its cache against the resource identifiers and regular expressions in the list.

Each match is invalidated by marking it stale and optionally removing it from the cache. This means that a future request for the resource will cause it to retrieve a new copy of the resource from the reflector.

When the repeater has completed the invalidation, it returns an acknowledgment to the master. The master waits until all repeaters have acknowledged the invalidation request.

If a repeater fails to acknowledge within a given period, it is disconnected from the master repeater. When it reconnects, it will be told to flush its entire cache, which will eliminate any consistency problem. (To avoid flushing the entire cache, the master could keep a log of all invalidations performed, sorted by date, and flush only files invalidated since the last time the reconnecting repeater successfully completed an invalidation. In the presently preferred embodiments this is not done since it is believed that repeaters will seldom disconnect.)

When all repeaters have acknowledged invalidation (or timed out) the repeater broadcasts a "phase 2" invalidation request to all repeaters. This causes the repeaters to remove the corresponding resource identifiers and regular expressions from the list of resource identifiers pending invalidation.

In another embodiment, the invalidation request will be extended to allow a "server push". In such requests, after phase 2 of the invalidation process has completed, the repeater receiving the invalidation request will immediately request a new copy of the invalidated resource to place in its cache.

Logs and Log Processing

Web server activity logs are fundamental to monitoring the activity in a Web site. This invention creates "merged logs" that combine the activity at reflectors with the activity at repeaters, so that a single activity log appears at the origin server showing all Web resource requests made on behalf of that site at any repeater.

This merged log can be processed by standard processing tools, as if it had been generated locally.

On a periodic basis, the master repeater (or its delegate) collects logs from each repeater. The logs collected are merged, sorted by reflector identifier and timestamp, and stored in a dated file on a per-reflector basis. The merged log for a given reflector represents the activity of all repeaters on behalf of that reflector. On a periodic basis, as configured by the reflector operator, a reflector contacts the master repeater to request its merged logs. It downloads these and merges them with its locally maintained logs, sorting by timestamp. The result is a merged log that represents all activity on behalf of repeaters and the given reflector.

Activity logs are optionally extended with information important to the repeater network, if the reflector is configured to do so by the reflector operator. In particular, an "extended status code" indicates information about each request, such as:

1. request was served by a reflector locally;
2. request was reflected to a repeater;*
3. request was served by a reflector to a repeater;*
4. request for non-repeatable resource was served by repeater;*
5. request was served by a repeater from the cache;
6. request was served by a repeater after filling cache;
7. request pending invalidation was served by a repeater.

(The activities marked with "*" represent intermediate states of a request and do not normally appear in a final activity log.)

In addition, activity logs contain a duration, and extended precision timestamps. The duration makes it possible to analyze the time required to serve a resource, the bandwidth used, the number of requests handled in parallel at a given time, and other quite useful information. The extended precision timestamp makes it possible to accurately merge activity logs.

Repeaters use the Network Time Protocol (NTP) to maintain synchronized clocks. Reflectors may either use NTP or calculate a time bias to provide roughly accurate timestamps relative to their contact repeater.

Enforcing Committed Aggregate Information Rate

The repeater network monitors and limits the aggregate rate at which data is served on behalf of a given subscriber by all repeaters. This mechanism provides the following benefits:

1. provides a means of pricing repeater service;
2. provides a means for estimating and reserving capacity at repeaters;
3. provides a means for preventing clients of a busy site from limiting access to other sites.

For each subscriber, a "threshold aggregate information rate" (TAIR) is configured and maintained at the master repeater. This threshold is not necessarily the committed rate, it may be a multiple of committed rate, based on a pricing policy.

Each repeater measures the information rate component of each reflector for which it serves resources, periodically (typically about once a minute), by recording the number of bytes transmitted on behalf of that reflector each time a request is delivered. The table thus created is sent to the master repeater once per period. The master repeater combines the tables from each repeater, summing the measured information of each reflector over all repeaters that serve resources for that reflector, to determine the "measured aggregate information rate" (MAIR) for each reflector.

If the MAIR for a given reflector is greater than the TAIR for that reflector, the MAIR is transmitted by the master to all repeaters and to the respective reflector.

When a reflector receives a request, it determines whether its most recently calculated MAIR is greater than its TAIR. If this is the case, the reflector probabilistically decides whether to suppress reflection, by serving the request locally (in B2). The probability of suppressing the reflection increases as an exponential function of the difference between the MAIR and the CAIR.

Serving a request locally during a peak period may strain the local origin server, but it prevents this subscriber from taking more than allocated bandwidth from the shared repeater network.

When a repeater receives a request for a given subscriber (in C2), it determines whether the subscriber is running near its threshold aggregate information rate. If this is the case, it probabilistically decides whether to reduce its load by redirecting the request back to the reflector. The probability increases exponentially as the reflector's aggregate information rate approaches its limit.

If a request is reflected back to a reflector, a special character string is attached to the resource identifier so that the receiving reflector will not attempt to reflect it again. In the current system, this string has the form "src=overload".

The reflector tests for this string in B2.

The mechanism for limiting Aggregate Information Rate described above is fairly coarse. It limits at the level of sessions with clients (since once a client has been reflected to a given repeater, the rewriting process tends to keep the client coming back to that repeater) and, at best, individual requests for resources. A more fine-grained mechanism for enforcing TAIR limits within repeaters operates by reducing the bandwidth consumption of a busy subscriber when other subscribers are competing for bandwidth.

The fine-grained mechanism is a form of data "rate shaping". It extends the mechanism that copies resource data to a connection when a reply is being sent to a client. When an output channel is established at the time a request is received, the repeater identifies which subscriber the channel is operating for, in C2, and records the subscriber in a data field associated with the channel. Each time a "write" operation is about to be made to the channel, the Metered Output Stream first inspects the current values of the MAIR and TAIR, calculated above, for the given subscriber. If the MAIR is larger than the TAIR, then the mechanism pauses briefly before performing the write operation. The length of the pause is proportional to the amount the MAIR exceeds the TAIR. The pause ensures that tasks sending other resources to other clients, perhaps on behalf of other subscribers, will have an opportunity to send their data.

Repeater Network Resilience

The repeater network is capable of recovering when a repeater or network connection fails.

A repeater cannot operate unless it is connected to the master repeater. The master repeater exchanges critical information with other repeaters, including information about repeater load, aggregate information rate, subscribers, and link cost.

If a master fails, a "succession" process ensures that another repeater will take over the role of master, and the network as a whole will remain operational. If a master fails, or a connection to a master fails through a network problem, any repeater attempting to communicate with the master will detect the failure, either through an indication from TCP/IP, or by timing out from a regular "heartbeat" message it sends to the master.

When any repeater is disconnected from its master, it immediately tries to reconnect to a series of potential masters based on a configurable file called its "succession list".

The repeater tries each system on the list in succession until it successfully connects to a master. If in this process, it comes to its own name, it takes on the role of master, and accepts connections from other repeaters. If a repeater which is not at the top of the list becomes the master, it is called the "temporary master".

A network partition may cause two groups of repeaters each to elect a master. When the partition is corrected, it is necessary that the more senior master take over the network. Therefore, when a repeater is temporary master, it regularly tries to reconnect to any master above it in the succession list. If it succeeds, it immediately disconnects from all of the repeaters connected to it. When they retry their succession lists, they will connect to the more senior master repeater.

To prevent losses of data, a temporary master does not accept configuration changes and does not process log files. In order to take on these tasks, it must be informed that it is primary master by manual modification of its successor list. Each repeater regularly reloads its successor list to determine whether it should change its idea of who the master is.

If a repeater is disconnected from the master, it must resynchronize its cache when it reconnects to the master. The master can maintain a list of recent cache invalidations and send to the repeater any invalidations it was not able to process while disconnected. If this list is not available for some reason (for instance, because the reflector has been disconnected too long), the reflector must invalidate its entire cache.

A reflector is not permitted to reflect requests unless it is connected to a repeater. The reflector relies on its contact repeater for critical information, such as load and Link Cost Tables, and current aggregate information rate. A reflector that is not connected to a repeater can continue to receive requests and handle them locally.

If a reflector loses its connection with a repeater, due to a repeater failure or network outage, it continues to operate while it tries to connect to a repeater.

Each time a reflector attempts to connect to a repeater, it uses DNS to identify a set of candidate repeaters given a domain name that represents the repeater network. The reflector tries each repeater in this set until it makes a successful contact Until a successful contact is made, the reflector serves all requests locally. When a reflector connects to a repeater, the repeater can tell it to attempt to contact a different repeater; this allows the repeater network to ensure that no individual repeater has too many contacts.

When contact is made, the reflector provides the version number of each of its tables to its contact repeater. The repeater then decides which tables should be updated and sends appropriate updates to the reflector. Once all tables have been updated, the repeater notifies the reflector that it may now start reflecting requests.

Using a Proxy Cache within a Repeater

Repeaters are intentionally designed so that any proxy cache can be used as a component within them. This is possible because the repeater receives HTTP requests and converts them to a form recognized by the proxy cache.

On the other hand, several modifications to a standard proxy cache have been or may be made as optimizations. This includes, in particular, the ability to conveniently invalidate a resource, the ability to support cache quotas, and the ability to avoid making an extra copy of each resource as it passes from the proxy cache through the repeater to the requester.

In a preferred embodiment, a proxy cache is used to implement C3. The proxy cache is dedicated for use only by one or more repeaters. Each repeater requiring a resource from the proxy cache constructs a proxy request from the inbound resource request. A normal HTTP GET request to a server contains only the pathname part of the URL—the scheme and server name are implicit. (n an HTTP GET request to a repeater, the pathname part of the URL includes the name of the origin server on behalf of which the request is being made, as described above.) However, a proxy agent GET request takes an entire URL. Therefore, the repeater must construct a proxy request containing the entire URL from the path portion of the URL it receives. Specifically, if the incoming request takes the form:

GET/<origin server>/<path> then the repeater constructs a proxy request of the form:

GET http://<origin server>/<path> and if the incoming request takes the form:

GET <origin server>@proxy=<scheme>:<type>@/<path> then the repeater constructs a proxy request of the form:

GET<scheme>://<origin server>/<path>

Cache Control

HTTP replies contain directives called cache control directives, which are used to indicate to a cache whether the attached resource may be cached and if so, when it should expire. A Web site administrator configures the Web site to attach appropriate directives. Often, the administrator will not know how long a page will be fresh, and must define a short expiration time to try to prevent caches from serving stale data. In many cases, a Web site operator will indicate a short expiration time only in order to receive the requests (or hits) that would otherwise be masked by the presence of a cache. This is known in the industry as "cache-busting". Although some cache operators may consider cache-busting to be impolite, advertisers who rely on this information may consider it imperative.

When a resource is stored in a repeater, its cache directives can be ignored by the repeater, because the repeater receives explicit invalidation events to determine when a resource is stale. When a proxy cache is used as the cache at the repeater, the associated cache directives may be temporarily disabled. However, they must be re-enabled when the resource is served from the cache to a client, in order to permit the cache-control policy (including any cache-busting) to take effect.

The present invention contains mechanisms to prevent the proxy cache within a repeater from honoring cache control directives, while permitting the directives to be served from the repeater.

When a reflector serves a resource to a repeater in B4, it replaces all cache directives by modified directives that are ignored by the repeater proxy cache. It does this by prefixing a distinctive string such as "wr-" to the beginning of the HTTP tag. Thus, "expires" becomes "wr-expires", and "cache-control" becomes "wr-cache-control". This prevents the proxy cache itself from honoring the directives. When a repeater serves a resource in C4, and the requesting client is not another repeater, it searches for HTTP tags beginning with "wr-" and removes the "wr-". This allows the clients retrieving the resource to honor the directives.

Resource Revalidation

There are several cases where a resource may be cached so long as the origin server is consulted each time it is served. In one case, the request for the resource is attached to a so-called "cookie". The origin server must be presented with the cookie to record the request and determine whether the cached resource may be served or not In another case, the request for the resource is attached to an authentication header (which identifies the requester with a user id and password). Each new request for the resource must be tested at the origin server to assure that the requester is authorized to access the resource.

The HTTP 1.1 specification defines a reply header tided "Must-Revalidate" which allows an origin server to instruct a proxy cache to "revalidate" a resource each time a request is received. Normally, this mechanism is used to determine whether a resource is still fresh. In the present invention, Must-Revalidate makes it possible to ask an origin server to validate a request that is otherwise served from a repeater.

The reflector rule base contains information that determines which resources may be repeated but must be revalidated each time they are served. For each such resource, in B4, the reflector attaches a Must-Revalidate header. Each time a request comes to a repeater for a cached resource marked with a Must-Revalidate header, the request is forwarded to the reflector for validation prior to serving the requested resource.

Cache Quotas

The cache component of a repeater is shared among those subscribers that reflect clients to that repeater. In order to allow subscribers fair access to storage facilities, the cache may be extended to support quotas.

Normally, a proxy cache may be configured with a disk space threshold T. Whenever more than T bytes are stored in the cache, the cache attempts to find resources to eliminate.

Typically a cache uses the least-recently-used (LRU) algorithm to determine which resources to eliminate; more sophisticated caches use other algorithms. A cache may also support several threshold values—for instance, a lower threshold which, when reached, causes a low priority background process to remove items from the cache, and a higher threshold which, when reached, prevents resources from being cached until sufficient free disk space has been reclaimed.

If two subscribers A and B share a cache, and more resources of subscriber A are accessed during a period of time than resources of subscriber B, then fewer of B's resources will be in the cache when new requests arrive. It is possible that, due to the behavior of A, B's resources will never be cached when they are requested. In the present invention, this behavior is undesirable. To address this issue, the invention extends the cache at a repeater to support cache quotas.

The cache records the amount of space used by each subscriber in $D_S$, and supports a configurable threshold $T_S$ for each subscriber.

Whenever a resource is added to the cache (at C3), the value $D_S$ is updated for the subscriber providing the resource. If $D_S$ is larger than $T_S$, the cache attempts to find resources to eliminate, from among those resources associated with subscriber S. The cache is effectively partitioned into separate areas for each subscriber.

The original threshold T is still supported. If the sum of reserved segments for each subscriber is smaller than the total space reserved in the cache, the remaining area is "common" and subject to competition among subscribers.

Note, this mechanism might be implemented by modifying the existing proxy cache discussed above, or it might also be implemented without modifying the proxy cache—if the proxy cache at least makes it possible for an external program to obtain a list of resources in the cache, and to remove a given resource from the cache.

Rewriting from Repeaters

When a repeater receives a request for a resource, its proxy cache may be configured to determine whether a peer cache contains the requested resource. If so, the proxy cache obtains the resource from the peer cache, which can be faster than obtaining it from the origin server (the reflector). However, a consequence of this is that rewritten HTML resources retrieved from the peer cache would identify the wrong repeater. Thus, to allow for cooperating proxy caches, resources are preferably rewritten at the repeater.

When a resource is rewritten for a repeater, a special tag is placed at the beginning of the resource. When constructing a reply, the repeater inspects the tag to determine whether the resource indicates that additional rewriting is necessary. If so, the repeater modifies the resource by replacing references to the old repeater with references to the new repeater.

It is only necessary to perform this rewriting when a resource is served to the proxy cache at another repeater.

Repeater-Side Include

Sometimes, an origin server constructs a custom resource for each request (for instance, when inserting an advertisement based on the history of the requesting client). In such a case, that resource must be served locally rather than repeated. Generally, a custom resource contains, along with the custom information, text and references to other, repeatable, resources.

The process that assembles a "page" from a text resource and possibly one or more image resources is performed by the Web browser, directed by HTML. However, it is not possible using HTML to cause a browser to assemble a page using text or directives from a separate resource. Therefore, custom resources often necessarily contain large amounts of static text that would otherwise be repeatable.

To resolve this potential inefficiency, repeaters recognize a special directive called a "repeater side include". This directive makes it possible for the repeater to assemble a custom resource, using a combination of repeatable and local resources. In this way, the static text can be made repeatable, and only the special directive need be served locally by the reflector.

For example, a resource X might consist of custom directives selecting an advertising banner, followed by a large text article. To make this resource repeatable, the Web site administrator must break out a second resource, Y, to select the banner. Resource X is modified to contain a repeater-side include directive identifying resource Y, along with the article. Resource Y is created and contains only the custom directives selecting an ad banner. Now resource X is repeatable, and only resource Y, which is relatively small, is not repeatable.

When a repeater constructs a reply, it determines whether the resource being served is an HTML resource, and if so, scans it for repeater-side include directives. Each such directive includes a URL, which the repeater resolves and substitutes in place of the directive. The entire resource must be assembled before it is served, in order to determine its final size, as the size is included in a reply header ahead of the resource.

Thus, a method and apparatus for dynamically replicating selected resources in computer networks is provided. One skilled in the art will appreciate that the present invention can be practiced by other than the described embodiments, which are presented for purposes of illustration and not limitation, and the present invention is limited only by the claims that follow.

What is claimed:

1. A method, in a system which includes (a) a repeater server network including a plurality of repeater servers, (b) a plurality of subscribers to the repeater server network, wherein the plurality of subscribers are entities that publish information via one or more origin servers, the origin servers being distinct from the plurality of repeater servers, and in which at least some of the repeater servers replicate some or all of the information available on the origin servers, (c) a repeater selector mechanism constructed and adapted to identify, for a particular client request, an appropriate repeater server from the plurality of repeater servers, and (d) a subscriber verifying mechanism constructed and adapted to verify whether an entity is any one of the plurality of subscribers to the repeater server network, the method comprising:

obtaining a client request for information, wherein the client request is for a resource which is embedded in another document;

identifying, by the repeater selector mechanism, a repeater server of the repeater server network to handle the client request;

determining, using at least the subscriber verifying mechanism, whether the requested information is from any one of the plurality of subscribers to the repeater server network; and providing, from the repeater server identified by the repeater selector mechanism, the requested information when the client request is determined to be for information from one of the plurality of subscribers to the repeater server network.

2. A method as in claim 1 further comprising: rejecting the client request when it is not for information from any one of the plurality of subscribers.

3. A method as in claim 2, further comprising:

when the client request is for information from a subscriber being the one of the plurality of subscribers, determining whether the requested information is cached locally at the repeater server, and, based, at least in part, on said determining, if the requested information is cached locally, retrieving the requested information; and when the requested information is determined not to be cached locally, obtaining the requested information either from an origin server of the subscriber from a peer cache.

4. A method as in claim 3, further comprising:

upon obtaining the requested information, caching the requested information locally.

5. A method as in claim 4 further comprising:

constructing a reply including the requested information; and sending the reply to a client initiating the client request.

6. A method as in claim 5 further comprising:

recording details of a transaction with the repeater server network.

7. A method as in claim 6 wherein the details include one or more of:

(a) a current time, (b) an address of a requester, (c) a Uniform Resource Locator (URL) requested, (d) a type of response generated by the repeater server, (e) whether the client request was served by the repeater server from the cache; (f) whether the client request was served by the repeater server alter filling a cache; (g) whether a request pending invalidation was served by the repeater server; (h) a duration indicative of the time required to serve the resource, and (i) bandwidth used to serve the resource.

8. A method, in a system which includes (a) a repeater server network including a plurality of repeater servers, (b) a plurality of subscribers to the repeater server network, the plurality of subscribers being entities that publish information via one or more origin servers, and in which the origin servers are distinct from the plurality of repeater servers, and in which at least some of the plurality of repeater servers replicate some or all of the information available on at least some of the origin servers, (c) a repeater selector mechanism constructed and adapted to identify, for a particular client request, an appropriate repeater server from the plurality of repeater servers, and (d) a subscriber verifying mechanism constructed and adapted to verify whether an entity is any one of the plurality of subscribers to the repeater server network, method comprising:

obtaining a client request for information by a repeater server of the plurality of repeater servers forming the repeater server network, the repeater server being identified by the repeater selector mechanism, wherein the client request is for a resource which is embedded in another document;

determining, using at least the subscriber verifying mechanism and based, at least in part, on a name by which the repeater server was addressed, whether the requested information is from any one of the plurality of entities that publish information to the repeater server network; and when the client request is determined to be for information from one of the plurality of entities that publish information to the repeater server network, serving the requested information from the repeater sewer as identified by the repeater selector mechanism.

9. A method, in a system which includes (a) a repeater server network including a plurality of repeater servers, (b) a plurality of subscribers to the repeater server network, the plurality of subscribers being entities that publish information via one or more origin servers, and in which the origin servers are distinct from the plurality of repeater servers, and in which at least some of the plurality of repeater servers replicate some or all of the information available on at least some of the origin servers, (c) a repeater selector mechanism constructed and adapted to identify, for a particular client request, an appropriate repeater server from the plurality of repeater servers, and (d) a subscriber verifying mechanism constructed and adapted to verify whether an entity is any one of the plurality of subscribers to the repeater server network, the method comprising:

obtaining a client request for information, the client request being for a resource which is embedded in another document which is sewed by an origin server of the one or more origin servers;

identifying, by the repeater selector mechanism, a repeater server of the repeater server network to handle the client request;

determining, using at least the subscriber verifying mechanism. and based, at least in part, on an origin sewer name in a Uniform Resource Locator (URL) associated with the client request, whether the requested information is from any one of the plurality of entities that publish information to the repeater server network; and when the client request is determined to be for information from one of the plurality of entities that publish information to the repeater server network, serving the requested information from the repeater server as identified by the repeater selector mechanism.

10. A method as in any one of claims 8 and 9, the determining further comprises:

using at least information in an Hypertext Transfer Protocol (HTTP) header of the client request to determine a name by which the repeater server was addressed.

11. A method, in a system which includes (a) a repeater server network including a plurality of repeater servers, (b) a plurality of subscribers to the repeater server network, wherein the plurality of subscribers are entities that publish information via at least one origin server, wherein the at least one origin server is distinct from the plurality of repeater servers, and in which at least some of the plurality of repeater servers replicate some or all of the information available on the at least one origin server, (c) a repeater selector mechanism constructed and adapted to identify, for a client request, a repeater server from the plurality of repeater servers to handle the client request, and (d) a subscriber verifying mechanism constructed and adapted to verify whether an entity is any one of the plurality of subscribers to the repeater server network, the method comprising, at one of the plurality of repeater servers:

(A) obtaining a client request for information from a client by the repeater server of the plurality of repeater servers forming the repeater server network, the repeater server having been identified by the repeater selector mechanism, the client request being for a resource which is embedded in another document;

(B) determining, using at least the subscriber verifying mechanism, whether the requested information is from a subscriber of the plurality of subscribers, said determining being based, at least in part, on at least one of (a) a name by which the repeater server was addressed, and (b) an origin server name in a Uniform Resource Locator (URL) used to make the client request;

(C) when the client request is determined to be for information from a subscriber to the repeater server network, then at the repeater server selected by the repeater selector mechanism:

(C1) if is determined that the requested information is cached locally at the repeater server, retrieving the requested information from a local cache at the repeater server; and (C2) when the requested information is determined not to be cached locally at the repeater server, (C21) obtaining the requested information from the origin server or from a peer cache;

(C22) caching the information locally at the repeater server; and (C3) constructing a reply including the requested information; and (C4) sending the reply to the client; and (D) when the client request is determined not to be for information from a subscriber to the repeater server network, rejecting the client request.

12. A method, in a system which includes (a) a repeater server network including a plurality of repeater servers, (b) a plurality of subscribers to the repeater server network, wherein the plurality of subscribers are entities that publish resources via at least one origin server, and wherein the at least one origin server is distinct from the plurality of repeater servers, (c) a repeater selector mechanism constructed and adapted to identify, for a particular request, a repeater server to handle the request, and (d) a subscriber verifying mechanism constructed and adapted to verify whether an entity is an one of the plurality of subscribers to the repeater server network, the method comprising:

on at least some of the repeater sewers in the repeater server network, replicating some or all of the information available on the at least one origin server;

upon receipt of a client request for information, the client request being for a resource which is embedded in another document, determining, using at least the subscriber verifying mechanism, whether the client request is for information from a known entity that publishes resources to the repeater server network; and serving the information, from the repeater server identified by the repeater selector mechanism, when the client request is determined to be for information from one of the plurality of subscribers being an entity that publishes resources to the repeater server network.

13. A method as in claim 12 further comprising:

rejecting the client request when it is not for information from a subscriber.

14. A method as in claim 13, further comprising:

if the client request is for information from a subscriber,
if the requested information is cached locally, retrieving the requested information from a cache; otherwise
obtaining the requested information from the at least one origin server or from a per cache.

15. A method as in claim 14 further comprising:

upon obtaining the requested information, caching the information locally.

16. A method as in claim 15 further comprising:

constructing a reply including the requested information, and
sending the reply to a client issuing the client request.

17. A method as in claim 16 further comprising:

recording details about a transaction between the client and the repeater server network.

18. A method as in claim 17 wherein the details include one or more of:

(a) a current time, (b) an address of a requester, (c) a Uniform Resource Locator GIRL) requested, (d) a type of response generated, (e) whether the client request was served by a repeater server from the cache; (1) whether the client request was served by a repeater server after filling a cache; (g) whether a request pending invalidation was served by a repeater server;

(h) a duration indicative of the time required to serve the resource, and (i) bandwidth used to serve the resource.

19. A method, in a system which includes (a) a repeater server network including a plurality of repeater servers, (b) a plurality of sub scribers to the repeater server network, wherein the plurality of subscribers are entities that publish resources via one or more origin servers, wherein the origin servers are distinct from the plurality of repeater servers, (c) a repeater selector mechanism constructed and adapted to identify, for a client request, a repeater server from the plurality of repeater servers to handle the client request, and (d) a subscriber verifying mechanism constructed and adapted to verify whether an entity is an one of the plurality of subscribers to the repeater server network, the method comprising:

on at least some of the plurality of repeater servers in the repeater sewer network, replicating some or all of the information available on the one or more origin servers;

identifying, by the repeater selector mechanism, a repeater server of the repeater server network to handle the client request;

upon receipt of the client request for information, the client request being for a resource which is embedded in another document, determining, by the subscriber verifying mechanism, and based, at least in part, on a name by which the repeater server in receipt of the client request was addressed, whether the client request is for information from a known entity that publishes resources to the repeater server network; and serving the information from the repeater server selected by the repeater selector mechanism when the client request is determined to be for information from a known entity that publishes resources to the repeater server network.

20. A method as in claim 19, wherein the repeater server in receipt of the request uses at least information in an Hypertext Transfer Protocol (HTTP) header of the client request to determine the name by which the repeater server was addressed.

21. A method, in a system which includes (a) a repeater server network including a plurality of repeater servers, (b) a plurality of subscribers to the repeater server network, wherein the plurality of subscribers are entities that publish resources via one or more origin servers, wherein the origin servers are distinct from the repeater servers, (c) a repeater selector mechanism constructed and adapted to identify, for a client request, a repeater server from the plurality of repeater servers to handle the request, and (d) a subscriber verifying mechanism constructed and adapted to verify whether an entity is any one of the plurality of subscribers to the repeater server network, the method comprising:

on at least some of the repeater servers in the repeater server network, replicating some or all of the information available on the one or more origin servers;

upon receipt of a client request for information, the request being for a resource which is embedded in another document, determining, using at least the subscriber verifying mechanism, and based, at least in part, on an origin server name in a Uniform Resource Locator (URL) used to make the client request, whether the client request is for information from a known entity that publishes resources to the repeater server network; and serving the information from the repeater server identified by the repeater selector mechanism when the client request is determined to be for information from a known entity that publishes resources to the repeater server network.

22. In a computer network which includes (a) a plurality of origin servers, (b) a plurality of repeater servers distinct from the plurality of origin servers and forming at least one repeater server network, (c) a repeater selector mechanism for identifying, for a request from a client, and based, at least in part, on a location of the client in the computer network, a repeater server of the plurality of repeater servers to handle the request, and (d) a subscriber verifying mechanism constructed and adapted to verify whether an entity is any one of the plurality of subscribers to the repeater server network, and in which at least one of the plurality of repeater servers replicates some or all of the information available on the plurality of origin servers, and in which requests for resources may be handled by the repeater server network in order for the resources to be served, a method comprising:

obtaining a client request from the client for a resource, the resource being embedded in another document if the client request for the resource is not for a resource from a subscriber to the repeater server network, as determined at least in part by the subscriber verifying mechanism rejecting the client request, otherwise constructing a reply including the resource and serving that reply from the repeater server identified by the repeater selector mechanism.

23. A method as in claim 22, wherein the resource is obtained by the repeater server of the plurality of repeater servers from the origin server of the plurality of origin servers, and wherein the repeater server determines the origin server from which to obtain the resources based, at least in part, upon the name by which the repeater server was addressed.

24. A method as in claim 22 wherein the resource is obtained by the repeater server of the plurality of repeater servers from the origin server of the plurality of origin servers, and wherein the repeater server determines the origin server from which to obtain the resources based, at least in part, upon information in an Hypertext Transfer Protocol (HTTP) header.

25. In a computer network which includes (a) a plurality of origin servers, and (b) at least one repeater server network including a plurality of repeater servers distinct from the plurality of origin servers, (c) a repeater selector mechanism for identifying an appropriate repeater server to handle a request, and in which at least one of the plurality of repeater servers replicates a portion of the information available on at least one of the plurality of origin servers, and (d) a subscriber verifying mechanism constructed and adapted to verify whether an entity is any one of a plurality of subscribers to the repeater server network, and in which requests may be handled by the repeater server network in order for resources to be served, a method comprising:

obtaining a request from a client for a resource, the resource being embedded in another document;

identifying, by the repeater selector mechanism, a repeater server of the repeater server network to handle the request;

if it is determined, at least in part by the subscriber verifying mechanism that the request is for information from a known subscriber, determining whether the resource is cached locally at the repeater server selected by the repeater selector mechanism, and, based, at least in part, on said determining, if the requested resource is in a cache of the repeater server, retrieving the resource; and when the resource is determined not to be cached locally at the repeater server, attempting to obtain the resource from the origin server of the plurality of origin servers or a peer cache, wherein the repeater server determines which origin server of the plurality of origin servers to use based, at least in part, upon the name by which the repeater server was addressed.

26. A server including a processor adapted and programmed to:

(i) replicate at least a portion of information available on a plurality of origin servers distinct from the server;

(ii) obtain a client request for information, the client request being for a resource which is embedded in another document;

(iii) determine, based, at least in part, on a name by which the server was addressed, and using a subscriber verifying mechanism constructed and adapted to verify that the name belongs to a subscriber to a repeater server network which includes the server, whether the client request is for information from a known subscriber to the repeater server network which includes the server; and (iv) serve the requested information to the client when the request is determined to be for information from the known subscriber to the repeater server network.

27. A server including a processor adapted and programmed to:

(i) replicate at least a portion of information available on a plurality of origin servers distinct from the server;

(ii) obtain a client request for information, the client request being for a resource which is embedded in another document served from an origin server of the plurality of origin servers;

(iii) determine, based, at least in part, on at least an origin server name in a Uniform Resource Locator (URL) used to make the client request, and using subscriber verifying mechanism constructed and adapted to verify that the origin server name belongs to a subscriber to a repeater server network which includes the server, whether the client request is for information from a known subscriber to a repeater server network which includes the server; and (iv) serve the information to the client when the client request is determined to be for information from the known subscriber to the repeater server network.

28. A server as in any one of claims 26 and 27, wherein the server uses at least information in an Hypertext Transfer Protocol (HTTP) header to determine the name by which the server was addressed.

29. A server as in claim 26 further programmed to:

reject the client request if the client request is not for information from a known subscriber.

30. A server as in claim 26, further programmed to:

if it is determined tat the client request is for information from the known subscriber, determine whether the information is cached locally at the server, and, based, at least in part, on said determining, if the information is cached locally, retrieve the information; and when the information is determined not to be cached locally, attempt to obtain the information from the origin server or from a peer cache.

31. A server as in claim 30 further programmed to:
upon obtaining the information, cache the information locally.

32. A server as in claim 31 further programmed to:
construct and send a reply including the information.

33. A server as in claim 32 further programmed to:
record details about a transaction involving the client request.

34. A server as in claim 33 wherein the details include one or more of:
the current time, the address of the client issuing the client request, the Uniform Resource Locator (URL) requested, and a type of response generated by the server.

35. A method as in claim 1 wherein, if the repeater server fails, another repeater server of the plurality of repeater servers will take over the role of the failed repeater server.

36. A method as in any one of claims 1–9, 11–21 wherein the repeater selector mechanism identifies the repeater server based, at least in part, on the load on at least some of the repeater servers.

37. A method as in any one of claims 1–9, 1–21 wherein the repeater selector mechanism identifies the repeater server based, at least in part, on a location on the network of a client sending the client request.

38. A method as in claim 1, wherein the repeater selector mechanism includes a network map for use in directing the client request for information.

39. A method as in claim 1 wherein the repeater selector mechanism is co-located wit one of the one or more origin servers.

40. A method as in any one of claims 1–9, 11–21 wherein the repeater selector mechanism identifies the repeater server based, at least in part, on at least (a) a load on at least some of the plurality of repeater servers forming the repeater server network, and (b) a location of a client sending The client request.

41. A method as in any one of claims 1–9, 11–21 wherein the repeater selector mechanism identifies the repeater server based, at least in part, on a relative cost of transmitting requested information between the repeater server and a client sending the client request.

42. A method as in any of claims 1–9, 11–21, wherein the other document is an HTML (Hyper Text Markup Language) document or an XML document which was served from the origin server.

43. A method as in any of claims 1–9, 11–21, wherein the document in which the client request was embedded was served from the origin server.

44. A method as in claim 42 wherein the requested resource is a video stream.

45. A method as in any of claims 1–9, 11–21, 22–25, wherein the subscriber verifying mechanism is located at a repeater server.

46. A method as in any claims 1–9, 11–21, 22–25, wherein the subscriber verifying mechanism comprises a table used to verify that an origin server belongs to a known subscriber.

47. A server as in any of claims 26 and 27, wherein the subscriber verifying mechanism is located at a repeater server.

48. A method as in any of claims 26 and 27 wherein the subscriber verifying mechanism comprises a table used to verify that an origin server belongs to a known subscriber.

* * * * *

UNITED STATES PATENT AND TRADEMARK OFFICE
CERTIFICATE OF CORRECTION

PATENT NO. : 6,654,807 B2  Page 1 of 1
APPLICATION NO. : 10/004430
DATED : November 25, 2003
INVENTOR(S) : David Farber et al.

It is certified that error appears in the above-identified patent and that said Letters Patent is hereby corrected as shown below:

Claim 8
Col. 27, line 54, change "sewer" to --server--;

Claim 9
Col. 28, line 13, change "sewer" to --server--;

Claim 12
Col. 29, line 23, change "sewers" to --servers--;

Claim 19
Col. 30, line 18, change "sewer" to --server--;

Claim 30
Col. 32, line 60, change "tat" to --that--; and

Claim 39
Col. 33, line 31, change "wit" to --with--.

Signed and Sealed this

Twenty-eighth Day of August, 2007

JON W. DUDAS
*Director of the United States Patent and Trademark Office*